(12) United States Patent
Desal et al.

(10) Patent No.: US 9,785,953 B2
(45) Date of Patent: Oct. 10, 2017

(54) SYSTEM AND METHOD FOR GENERATING DEMAND GROUPS

(75) Inventors: Paritosh Desal, Santa Clara, CA (US); Kamal Gajendran, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 868 days.

(21) Appl. No.: 12/720,661

(22) Filed: Mar. 9, 2010

(65) Prior Publication Data

US 2010/0228604 A1 Sep. 9, 2010

Related U.S. Application Data

(63) Continuation-in-part of application No. 12/567,731, filed on Sep. 25, 2009, and a continuation-in-part of application No. 12/626,666, filed on Nov. 26, 2009.

(51) Int. Cl.
*G06Q 30/02* (2012.01)
*G06Q 30/00* (2012.01)

(52) U.S. Cl.
CPC ......... *G06Q 30/02* (2013.01); *G06Q 30/0202* (2013.01); *G06Q 30/0205* (2013.01)

(58) Field of Classification Search
USPC ..................................... 705/26.7, 7.31, 7.36
See application file for complete search history.

(56) References Cited

U.S. PATENT DOCUMENTS

| | | |
|---|---|---|
| 3,017,610 A | 1/1962 | Auerbach et al. |
| 4,744,026 A | 5/1988 | Vanderbei |

(Continued)

FOREIGN PATENT DOCUMENTS

| | | |
|---|---|---|
| JP | 2006146696 A | 6/2006 |
| KR | 1020070115080 | 12/2007 |
| WO | WO 97/46950 | 12/1997 |
| WO | WO 98/53415 | 11/1998 |
| WO | 0070560 | 11/2000 |
| WO | WO 00/70519 | 11/2000 |
| WO | WO 00/70556 | 11/2000 |

OTHER PUBLICATIONS

Byung-Do Kim et al., "Modeling the Distribution of Price Sensitivity and Implications for Optimal Retail Pricing", Journal of Business & Economic Statistics, Jul. 1995, vol. 13, No. 3.

(Continued)

*Primary Examiner* — Mark A Fleischer
(74) *Attorney, Agent, or Firm* — Rahan Uddin; Edell, Shapiro & Finnan, LLC

(57) ABSTRACT

The present invention relates to a system and method for generating demand groups. The system receives demand group modeling data including a product listing, point of sales data, available econometric data and product information. Attributes may then be assigned to the products based upon product identifiers, size, flavor, brand, and product descriptions utilizing natural language processing. The products may then be clustered according to the attributes and point of sales data. One or more decision trees may be generated for the product listings using the point of sales data. Demand rules may be received, which may be applied to the product clusters and the decision trees to generate demand groups. A confidence score may be generated for each product indicating how well that product fits within the demand group. These confidence scores may be compared against a threshold. Products with scores below the threshold may be flagged for user review.

28 Claims, 34 Drawing Sheets

(56) References Cited

U.S. PATENT DOCUMENTS

| | | |
|---|---|---|
| 4,862,357 A | 8/1989 | Ahistrom et al. |
| 4,907,170 A | 3/1990 | Bhattacharya |
| 5,063,506 A | 11/1991 | Brockwell et al. |
| 5,117,354 A | 5/1992 | Long et al. |
| 5,189,606 A | 2/1993 | Burns et al. |
| 5,212,791 A | 5/1993 | Damian et al. |
| 5,249,120 A | 9/1993 | Foley |
| 5,299,115 A | 3/1994 | Fields et al. |
| 5,377,095 A | 12/1994 | Maeda et al. |
| 5,459,656 A | 10/1995 | Fields et al. |
| 5,521,813 A | 5/1996 | Fox et al. |
| 5,615,109 A | 3/1997 | Eder |
| 5,694,551 A | 12/1997 | Doyle et al. |
| 5,712,985 A | 1/1998 | Lee et al. |
| 5,732,401 A | 3/1998 | Conway |
| 5,765,143 A | 6/1998 | Sheldon et al. |
| 5,774,868 A | 6/1998 | Cragun et al. |
| 5,790,643 A | 8/1998 | Gordon et al. |
| 5,799,286 A | 8/1998 | Morgan et al. |
| 5,822,736 A | 10/1998 | Hartman et al. |
| 5,832,456 A | 11/1998 | Fox et al. |
| 5,832,458 A | 11/1998 | Jones |
| 5,873,069 A | 2/1999 | Reuhl et al. |
| 5,878,400 A | 3/1999 | Carter, III |
| 5,918,209 A | 6/1999 | Campbell et al. |
| 5,933,813 A | 8/1999 | Teicher et al. |
| 5,987,425 A | 11/1999 | Hartman et al. |
| 6,009,407 A | 12/1999 | Garg |
| 6,029,139 A | 2/2000 | Cunningham et al. |
| 6,032,123 A | 2/2000 | Jameson |
| 6,032,125 A | 2/2000 | Ando |
| 6,044,357 A | 3/2000 | Garg |
| 6,052,686 A | 4/2000 | Fernandez et al. |
| 6,078,893 A | 6/2000 | Ouimet et al. |
| 6,094,641 A | 7/2000 | Ouimet et al. |
| 6,125,355 A | 9/2000 | Bekaert et al. |
| 6,134,534 A | 10/2000 | Walker et al. |
| 6,173,345 B1 | 1/2001 | Stevens |
| 6,202,070 B1 | 3/2001 | Nguyen et al. |
| 6,205,431 B1 | 3/2001 | Willemain et al. |
| 6,219,649 B1 | 4/2001 | Jameson |
| 6,308,162 B1 | 10/2001 | Ouimet et al. |
| 6,321,207 B1 | 11/2001 | Ye |
| 6,341,268 B2 | 1/2002 | Walker et al. |
| 6,341,269 B1 | 1/2002 | Dulaney et al. |
| 6,397,193 B1 | 5/2002 | Walker et al. |
| 6,405,175 B1 | 6/2002 | Ng |
| 6,430,539 B1 | 8/2002 | Lazarus et al. |
| 6,456,986 B1 | 9/2002 | Boardman et al. |
| 6,536,935 B2 | 3/2003 | Parunak et al. |
| 6,546,387 B1 | 4/2003 | Triggs |
| 6,553,352 B2 | 4/2003 | Delurgio et al. |
| 6,567,824 B2 | 5/2003 | Fox |
| 6,609,101 B1 | 8/2003 | Landvater et al. |
| 6,684,193 B1 | 1/2004 | Chavez et al. |
| 6,697,824 B1 | 2/2004 | Bowman-Amuah |
| 6,725,208 B1 | 4/2004 | Hartman et al. |
| 6,731,998 B2 | 5/2004 | Walser et al. |
| 6,735,572 B2 | 5/2004 | Landesmann |
| 6,745,184 B1 | 6/2004 | Choi et al. |
| 6,826,538 B1 | 11/2004 | Kalyan et al. |
| 6,910,017 B1 | 6/2005 | Woo et al. |
| 6,934,931 B2 | 8/2005 | Plumer et al. |
| 6,965,867 B1 | 11/2005 | Jameson |
| 6,988,076 B2 | 1/2006 | Ouimet |
| 7,058,617 B1 | 6/2006 | Hartman et al. |
| 7,062,447 B1 | 6/2006 | Valentine et al. |
| 7,072,848 B2 | 7/2006 | Boyd et al. |
| 7,092,929 B1 | 8/2006 | Dvorak et al. |
| 7,155,402 B1 | 12/2006 | Dvorak |
| 7,302,410 B1 | 11/2007 | Venkatraman et al. |
| 7,437,308 B2* | 10/2008 | Kumar ................ G06Q 10/087 705/7.33 |
| 7,523,047 B1 | 4/2009 | Neal et al. |
| 7,657,470 B1 | 2/2010 | Delurgio et al. |
| 7,899,691 B1 | 3/2011 | Lee et al. |
| 7,958,020 B2* | 6/2011 | Inoue ................ G06Q 30/0202 705/28 |
| 8,027,865 B2* | 9/2011 | Gilbert ............ G06Q 10/06375 705/7.31 |
| 8,055,592 B2* | 11/2011 | Boyle ................ G06F 17/2705 706/12 |
| 8,200,590 B2* | 6/2012 | Triantafillidis ......... G06F 17/11 706/14 |
| 2001/0014868 A1 | 8/2001 | Herz et al. |
| 2002/0023001 A1 | 2/2002 | McFarlin et al. |
| 2002/0042739 A1 | 4/2002 | Srinivasan et al. |
| 2002/0042755 A1 | 4/2002 | Kumar et al. |
| 2002/0107819 A1 | 8/2002 | Ouimet |
| 2002/0116348 A1 | 8/2002 | Phillips et al. |
| 2002/0123930 A1 | 9/2002 | Boyd et al. |
| 2002/0169657 A1 | 11/2002 | Singh et al. |
| 2002/0198794 A1 | 12/2002 | Williams et al. |
| 2003/0028437 A1 | 2/2003 | Grant et al. |
| 2003/0177103 A1 | 9/2003 | Ivanov et al. |
| 2003/0200185 A1 | 10/2003 | Huerta et al. |
| 2003/0220830 A1 | 11/2003 | Myr |
| 2004/0111358 A1 | 6/2004 | Lange et al. |
| 2004/0243432 A1 | 12/2004 | Kelly et al. |
| 2005/0055275 A1 | 3/2005 | Newman et al. |
| 2005/0096963 A1 | 5/2005 | Myr et al. |
| 2005/0108070 A1 | 5/2005 | Kelly et al. |
| 2005/0273377 A1 | 12/2005 | Ouimet et al. |
| 2006/0161504 A1 | 7/2006 | Walser et al. |
| 2006/0224534 A1 | 10/2006 | Hartman et al. |
| 2008/0077572 A1* | 3/2008 | Boyle ................ G06F 17/2705 |
| 2008/0086429 A1 | 4/2008 | Venkatraman et al. |
| 2008/0249870 A1 | 10/2008 | Angell et al. |
| 2009/0018996 A1* | 1/2009 | Hunt ..................... G06Q 30/02 |
| 2009/0216576 A1 | 8/2009 | Saeed et al. |
| 2009/0271245 A1* | 10/2009 | Joshi ................ G06Q 30/0202 705/7.31 |
| 2010/0145772 A1 | 6/2010 | McCauley et al. |
| 2010/0145773 A1 | 6/2010 | Desai et al. |
| 2011/0208569 A1 | 8/2011 | Fano et al. |
| 2011/0320248 A1 | 12/2011 | Gorelik |

OTHER PUBLICATIONS

PCT International Search Report and the Written Opinion, Application No. PCT/US2010/058107, mailed Mar. 21, 2011, 9 pages.

PCT International Preliminary Report on Patentability, WIPO, Application No. PCT/US2010/058107, mailed Apr. 5, 2012, 6 pages.

Diebold, Francis X., "The Past, Present, and Future of Macroeconomic Forecasting" Economic Perspectives (IJEP), vol. 12, No. 2, pp. 175-192, Spring 1998.

Montgomery: "The Impact of Micro-Marketing on Pricing Strategies", 1994 The University of Chicago vol. 55/12-A of Dissertation of Abstracts International, p. 3922 (Abstract Only).

Busch: "Cost Modeling as a Technical Management Tool", Research-Technology Management, Nov./Dec. 1994, vol. 37, No. 6, pp. 50-56.

Deighton, John, et al., "The Effects of Advertising on Brand Switching and Repeat Purchasing", Journal of Marketing Research, vol. XXXI, Feb. 1994, pp. 28-43.

Kadiyali et al., "Manufacturer-retailer Channel Interactions and Implications for channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Hillier, Frederick S., et al., "Introduction to Operations Research", McGraw-Hill, Inc., 1995, Sixth Edition, pp. 1-14.

"KhiMetrics Helps Retailers Increase Margins with Two New Tools for Their Retail Revenue Management Application Suite." PR Newswire, Mar. 1, 2001.

"KhiMetrics and Retek Form Marketing Alliance for Comprehensive Retail Pricing Solution." PR Newswire, Feb. 19, 2001.

Barth, Brad. "ShopKo Holds the Price Line." Daily News Record, p. 10, Oct. 4, 2000.

(56) References Cited

OTHER PUBLICATIONS

"Manugistics Agrees to Acquire Talus Solutions." PR Newswire, Sep. 21, 2000.
"Goodyear Implements Trilogy's MultiChannel Pricing Solution as Its Enterprise-Wide E-Pricer Platform." Business Wire, p. 2286, Jun. 27, 2000.
"IMRglobal Signs New Product Implementation Agreement with Retek to Improve Retail Pricing and Markdown Process." Business Wire, p. 1590, Jun. 7, 2000.
"New Tools for Modeling Elasticity, Optimizing Prices and Collecting Live Pricing from the Web to Debut at Retail Systems 2000 in Chicago." Business Wire, p. 1484, Apr. 18, 2000.
Smith et al., "A Discrete Optimization Model for Seasonal Merchandise Planning." Journal of Retailing, vol. 74, No. 2, p. 193(29), Summer 1998.
Barth, Brad, "Shopko Tests Automated Markdowns", WWD Oct. 4, 2000, pp. 1-3.
Cook, Martie, "Optimizing Space and Sales with Markdown Software", Office.com, May 31, 2000, p. 1.
"Essentus and Spotlight Solutions Partnership Delivers Precise Markdown Decisions", Business Wire, Apr. 17, 2000, 3 pages.
Melcer, Rachel, "Local Tech Firm Creates Retail Markdown Tool", Business Courier online, Mar. 24, 2000, pp. 1-4.
Technology Strategy Incorporated, www.grossprofit.com, Mar. 2, 2000, pp. 1-20.
Flanagan, David, "Javascript: The Definitive Guide, $3^{rd}$ Edition," published by O'Reilly in Jun. 1998 (ISBN 1-56592-392-8) section 14.8.
Berners-Lee, T., "Hypertext Markup Language 2.0 Working Paper," Nov. 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Scherage, Dan, "You Do the Math", Chain Store Age, v76, n7, Jul. 2000.
"Gymboree Enhances Price Management", Retail Systems Alert, vol. 13, No. 6, Jun. 2000.
Binkley, James K., and John M. Connor, "Grocery Market Pricing and the New Competitive Environment." Journal of Retailing, v74, n2, Summer 1998.
"Merriam Webster's Collegiate Dictionary", $10^{th}$ edition, p. 585, Merriam-Webster Incorporated, 1999.
Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.
A.F.M. Smith, "A General Bayesian Linear Model," University of Oxford, Apr. 1972.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distributions and Bayesian Regression Analysis With G-Prior Distributions," Elsevier Science Publishers, 1986 (pp. 233-243).
D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"PCT International Search Report", Application No. PCT/US03/30488, mailed Jan. 28, 2004.
"PCT International Search Report", Application No. PCT/US02/14977, mailed May 5, 2003.
Dyer, Robert F., et al., "Case Studies in Marketing Decisions Using Expert Choice" Decision Support Software, 1988, pp. 2-7, 73-108.
"PCT International Search Report", Application No. PCT/US02/36710, mailed Jul. 21, 2003.
Yoeman, John Cornelius, Jr. "The Optimal Offering Price for Underwritten Securities", vol. 55/01-A of Dissertation Abstracts International, p. 4743; 1993 (Abstract only).
"Pacificorp IRP: Renewables Costs Must Drop 65% to Be Competitive with Gas" McGraw-Hill Publications, Dec. 8, 1995.
"Report of Novelty Search" by Patentec, dated Feb. 9, 2001.
Rossi, Delurgio, & Kantor; "Making Sense of Scanner Data;" Harvard Business Review, Reprint F00205, 2000.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; "Bayesian Semiparametric Regression: An Exposition and Application to Print Advertising;" Jan. 3, 1997; Australian Graduate School of Management, University of New South Wales, Sydney 2052, Australia.
Blattberg and Deighton, "Manage Marketing by the Customer Equity;" Harvard Business Review, Jul.-Aug. 1996, pp. 136-144.
Christen, Gupta, Porter, Staelin & Wittink; "Using Market-Level Data to Understand the Effectiveness of Promotional Activities;" Dec. 22, 1995.
Link, Ross; "Are Aggregate Scanner Data Models Biased?" Journal of Advertising Research, Sep./Oct. 1995, pp. RC8-RC12, ARF.
Russell & Kamakura, "Understanding Brand Competition Using Micro and Macro Scanner Data," Journal of Marketing Research, vol. XXXI (May 1994), pp. 289-303.
Jones, John Philip, "The Double Jeopardy of Sales Promotions," Harvard Business Review, Sep.-Oct. 1999, pp. 145-152.
Supplementary European Search Report, Application No. 02719197.2-2221, Feb. 2, 2007.
Buzzell, Quelch, and Salmon, "The Costly Bargain of Trade Promotion;" Harvard Business Review, reprint 90201, Mar.-Apr. 1990, pp. 1-9.
Curry, Divakar, Mathur, and Whiteman; "BVAR as a Category Management Tool: An Illustration and Comparison with Alternative Techniques;" Journal of Forecasting, vol. 14, Issue No. 3 (1995), pp. 181-199.
"Report of Novelty Search" by Patentec, dated Jul. 25, 2001.
Stephen J. Hoch et al., "Store Brands and Category Management", The Wharton School, University of Pennsylvania, Mar. 1998, pp. 1-38.
Bruce G.S. Hardie et al., "Attribute-based Market Share Models: Methodological Development and Managerial Applications", The Wharton School, University of Pennsylvania, Working Paper 98-009, pp. 1-48, 1998.
Alan Mercer, "Non-linear Price Effects", Journal of the Market Research Society, dated Jul. 1, 1996, p. 227.
Rockney G. Walters, "Assessing the Impact of Retail Price Promotions on Product Substitution, Complementary Purchase, and Interstore Sales Displacements", Journal of Marketing, vol. 55, Apr. 1991, pp. 17-28.
Robert C. Blattberg et al., "How Promotions Work", Marketing Science, vol. 14. No. 3, Part 2 of 2, 1995, pp. G122-G132.

(56) References Cited

OTHER PUBLICATIONS

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 4-11.

Fusun Gonul, "Modeling Multiple Sources of Heterogeneity in Multinomial Logit Models: Methodological and Managerial Issues", Marketing Science, vol. 12, No. 3, Summer 1993, pp. 213-229.

Robert M. Schindler et al., "Increasing Consumer Sales Response Through Use of 99-Ending Prices", Journal of Retailing, Jun. 1, 1996, p. 187.

Francis J. Mulhern et al., "The Relationship between Retail Price Promotions and Regular Price Purchases", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does It Matter How Price Promotions Are Operationalized?", Marketing Letters 8:2 (1997), pp. 167-181.

William R. Dillon et al., "A Segment-level Model of Category Volume and Brand Choice", Marketing Science, vol. 15, No. 1, 1996, pp. 38-59.

Stephen J. Hoch et al., Determinants of Store-Level Price Elasticity, Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice Among SKUs", Journal of Marketing Research, vol. XXXIII (Nov. 1996), pp. 442-452.

PCT International Search Report & the Written Opinion of the International Searching Authority, Application No. PCT/US07/20678, mailed Feb. 26, 2008.

* cited by examiner

SYSTEM AND METHOD FOR GENERATING DEMAND GROUPS

CROSS REFERENCE TO RELATED APPLICATIONS

This application includes subject matter in the general area of U.S. application Ser. No. 09/741,956 filed on Dec. 20, 2000, entitled "Econometric Engine", now U.S. Pat. No. 7,899,691, which is hereby fully incorporated by reference.

This is also a continuation-in-part of co-pending United States Application Ser. No. 12/567,731 filed on Sep. 25, 2009, entitled "System and Method for Analyzing Customer Segments", which is hereby fully incorporated by reference.

This is also a continuation-in-part of co-pending U.S. application Ser. No. 12/626,666 filed on Nov. 26, 2009, entitled "System and Method for Generating Product Decisions", which is hereby fully incorporated by reference.

BACKGROUND

The present invention relates to a system and method for a business tool for automatically generating product demand groups in a retail setting for improving efficiency of demand modeling. This business tool may be stand alone, or may be integrated into a pricing optimization system to provide more effective pricing of products. More particularly, the present auto demand group generator system may identify and group products by attributes into demand groups. 'Demand groups', for the purpose of this application, refers to groupings of highly substitutable products. From these generated demand groups the system may generate further business decisions such as price optimizations, product assortments and promotion decisions.

For a business to properly and profitably function there must be proper pricing of the inventory which, over a sustained period, effectively generates more revenue than costs incurred. In order to reach a profitable condition the business is always striving to increase revenue while reducing costs.

One such method to increase revenue is providing a desirable set of products and properly pricing these products or services being sold. Additionally, the use of promotions may generate increased sales which aid in the generation of revenue. Likewise, costs may be decreased by ensuring that only required inventory is shipped and stored. Also, reducing promotion activity reduces costs. Thus, in many instances, there is a balancing between a business activity's costs and the additional revenue generated by said activity. The key to a successful business is choosing the best activities which maximize the profits of the business.

Choosing these profit maximizing activities is not always a clear decision. There may be no readily identifiable result to a particular activity. Other times, the profit response to a particular promotion may be counter intuitive. Thus, generating systems and methods for identifying and generating business activities which achieves a desired business result is a prized and elusive goal.

A number of business decision suites are available to facilitate product inventory, pricing and promotional activity. In these known systems, product demand and elasticity may be modeled to project sales at a given price. The most advanced models include cross elasticity between sales of various products. While these methods of generating prices and promotions may be of great use to a particular business, there are a number of problems with these systems. Particularly, due to the large inventories many retailers have (some retailers carry thousands of products in any given store) the ability to accurately model demand for every product may be computationally prohibitive due to resource and time limitations.

In order to reduce computational requirements when modeling product demands, a number of possible solutions have been attempted. For example, some demand modeling systems may estimate the value of particular variables when running demand models. Particularly, elasticities between weakly interactive products may be estimated, or even eliminated entirely, from the demand functions in an attempt to reduce the computations required. This estimation based solution may reduce computations; however, these efficiency gains may come at the cost of the demand model's accuracy.

Other solutions include partial demand modeling for particular products (as opposed to the entire product inventory), less accurate but simpler modeling functions, and aggregation of products into groups for group modeling, among other solutions. In general, these methods all increase modeling efficiency, but again, there is often a cost associated with said efficiencies. For example, simpler models may result in less accurate models, and modeling for a subset of products may ignore important cross elasticities.

One such method currently utilized to reduce computations involves grouping products and modeling demand for the group rather than for individual products. This method may lose some of the granularity that product level modeling provides dependent upon group content and size. It has been found that groups of highly substitutable products (known as demand groups) function well to minimize computational loads yet achieve accurate modeling data. However, generation of demand models is often a tedious process which requires close review of each product by a knowledgeable individual. This is time consuming and costly, and may pose a significant hang-up for price optimizations. This is further exasperated when new products are introduced which the individual has little knowledge of.

It is therefore apparent that an urgent need exists for a system for semi-automatically generating demand groups given a particular product set for demand modeling. This auto demand model generator enables rapid and efficient generation of demand groups for the improvement of demand modeling efficiency. When coupled to a pricing optimization system, the auto demand group generator may generate pricing for the given products more efficiently. This auto demand group generator provides businesses with an advanced competitive tool to greatly increase business profitability.

SUMMARY

To achieve the foregoing and in accordance with the present invention, a system and method for generating demand groups is provided. In particular, the system and methods receives a listing of products for generation of demand groups. The system may then utilize the attributes of the given products to generate demand groups. The demand groups may then be fed to downstream pricing optimization and/or business decision systems.

One embodiment of the system for generating demand groups may be useful in association with a price optimization system. Embodiments of this system receive demand group modeling data including a product listing, point of sales data, available econometric data and product information. Product information may include descriptions of the data. Attributes may then be assigned to the products based upon product identifiers, size, flavor, brand, and product descriptions. Attribute assignment by product descriptions may, in some embodiments, utilize natural language processing. Weights may be applied to the attributes and point of sales data indicating the relative importance of the particular attribute of transaction.

After attributes have been assigned to the products, they may be clustered according to the attributes and point of sales data. Product clustering may utilize any of hierarchical clustering, k-means clustering, locality sensitive hashing, QT clustering, EM algorithms and model based clustering.

One or more decision trees may be generated for the product listings using the point of sales data. Decision trees are logical models of a consumer's decision process at the point of purchase. Decision trees provide useful information regarding the relatedness of products.

One or more demand rules may be received. These demand rules may place limits on the number content and prioritization of attributes for demand group creation. These demand rules may be applied to the developed product clusters and the decision trees to generate demand groups.

Additionally, in some embodiments, a confidence score may be generated for each product indicating how well that product fits within the demand group. These confidence scores may be compared against a threshold. Products with scores below the threshold may be flagged for user review. In this way, difficult classifications may be subject to manual demand grouping.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to a system and methods for a business tool for generating demand groups for use in demand modeling. The models may then be utilized to generate business decisions such as product pricing and promotions. For the purposes of the present application 'demand groups' may be defined as groupings of highly substitutable products. This business tool may be stand alone, or may be integrated into a pricing optimization system to provide more effective pricing of products.

Figure 1:
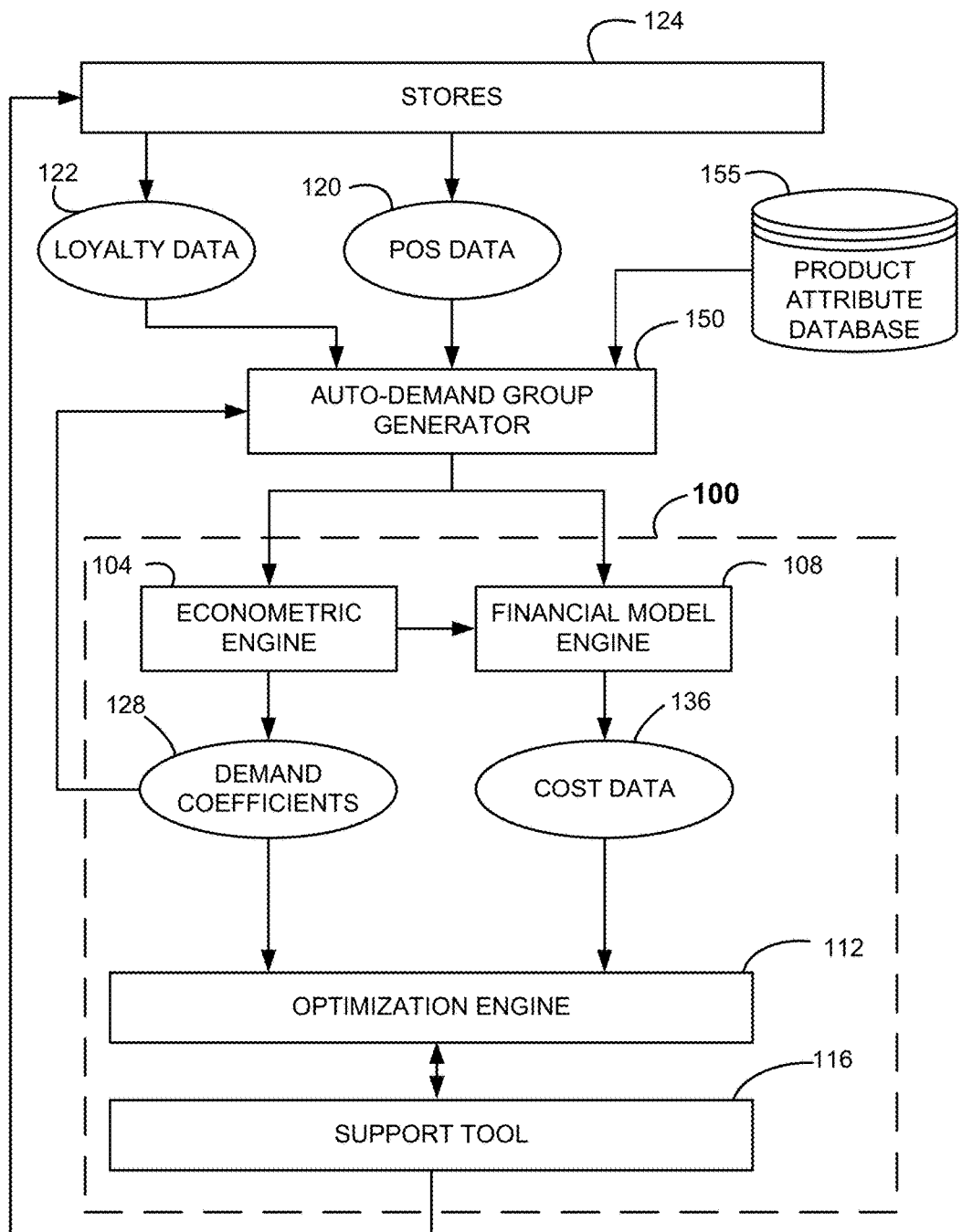
FIG. 1 is a high level schematic view of an embodiment of a price optimization system with an integrated demand group generator system.
Figure 2:
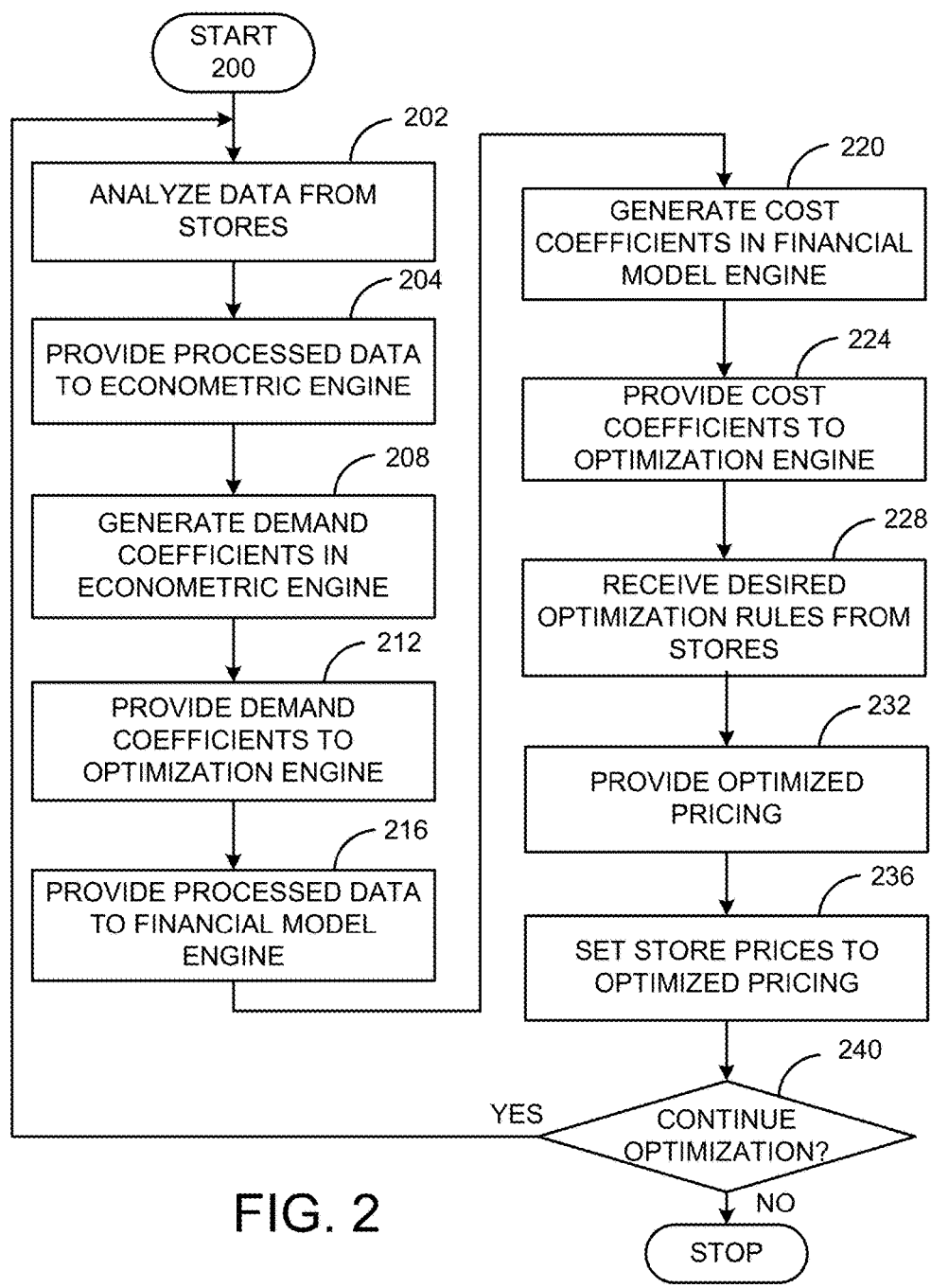
FIG. 2 is high level flow chart of an optimization process.
Figure 3:
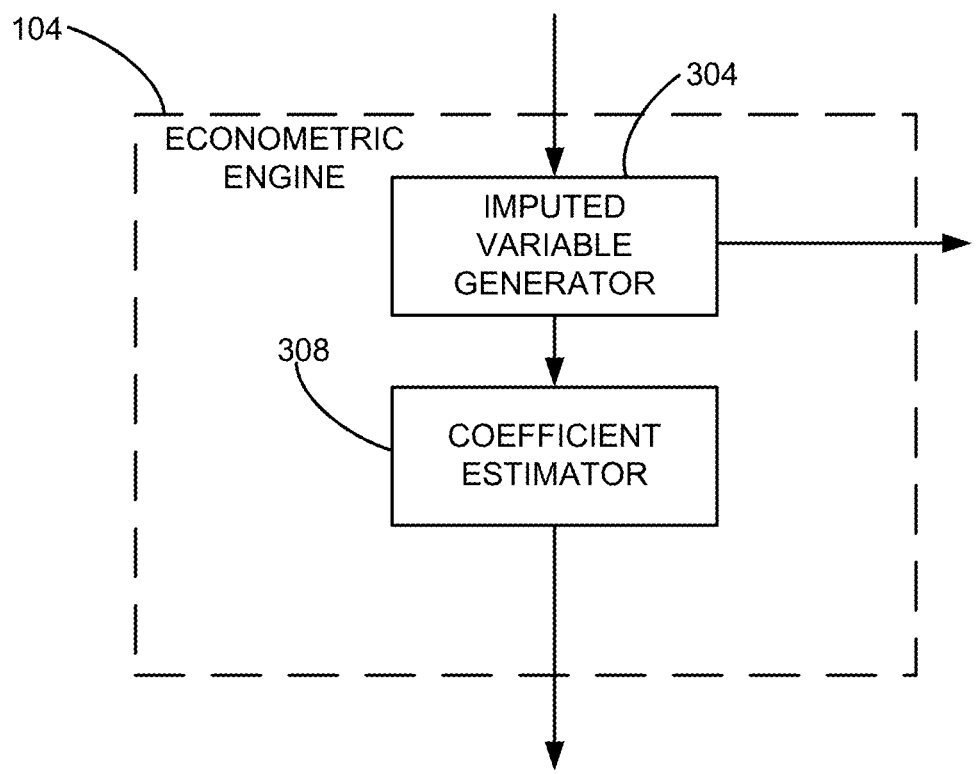
FIG. 3 is a more detailed schematic view of the econometric engine.

To facilitate discussion, FIGS. 1 and 2 show an auto demand group generator coupled to an optimization system and methods for such a system. FIGS. 3-6 illustrate the optimization system and methods in more detail. General computer systems for the optimization system and demand group generator system may be seen at FIGS. 7 and 8. FIGS. 9 to 12D illustrate data error correction for optimization. FIGS. 13-20 show various pricing optimization processes.

FIGS. 21 to 24 detail the auto demand group generator. Likewise, FIGS. 26 to 31 illustrate the method of generating demand groups. FIGS. 25A and 25B provide examples of decision trees.

Although useful for determining which grouping product may be clustered into based upon product attributes the Auto Demand Group Generator 150 described below demonstrates particular utility for determining highly substitutable product groupings (demand groups) in a consumer setting. Additionally, when coupled to an optimization system as illustrated at FIG. 1, the Auto Demand Group Generator 150 may function as a particularly effective business tool.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Optimization System Overview

To facilitate discussion, FIG. 1 is a schematic view of a Price Optimizing System for Business Planning 100. The Price Optimizing System for Business Planning 100 comprises an Econometric Engine 104, a Financial Model Engine 108, an Optimization Engine 112, a Support Tool 116, and an Auto Demand Group Generator 150. The Econometric Engine 104 is connected to the Optimization Engine 112, so that the output of the Econometric Engine 104 is an input of the Optimization Engine 112. The Financial Model Engine 108 is connected to the Optimization Engine 112, so that the output of the Financial Model Engine 108 is an input of the Optimization Engine 112. Likewise, the Auto Demand Group Generator 150 is connected to the Financial Model Engine 108 and the Econometric Engine 104, so that the output of the Auto Demand Group Generator 150 is an input of the Financial Model Engine 108 and the Econometric Engine 104. Although not presently illustrated, the Auto Demand Group Generator 150 may, in some embodiments, constitute a separate component from the remainder of the optimization system.

The Optimization Engine 112 is connected to the Support Tool 116 so that output of the Optimization Engine 112 is provided as input to the Support Tool 116 and output from the Support Tool 116 may be provided as input to the Optimization Engine 112. Likewise, both the Optimization Engine 112 and the Econometric Engine 104 are connected to the Auto Demand Group Generator 150 so that feedback from the Optimization Engine 112 and the Econometric Engine 104 is provided to the Auto Demand Group Generator 150. The Econometric Engine 104 may also exchange data with the Financial Model Engine 108.

Point of Sales (POS) Data 120 is provided from the Stores 124 to the Auto Demand Group Generator 150. Likewise, Loyalty Data 122 may, in some embodiments, be provided from the Stores 124 to the Auto Demand Group Generator 150. Loyalty Data 122 includes collected customer data (such as a membership and/or rewards card data) linking transactions to a particular customer. Loyalty data may often include granular data and a personal ID for each customer or household. Also, a Product Attribute Database 155 may be utilized by the Auto Demand Group Generator 150 for the generation of demand groups.

FIG. 2 is a high level flow chart of a process that utilizes the Price Optimizing System for Business Planning 100. The operation of the Price Optimizing System for Business Planning 100 will be discussed in general here and in more detail further below. Data 120 is provided from the Stores 124 for data analysis including data cleansing (step 202). Generally, the data 120 provided may include point-of-sale information, product information, and store information. Processed data may then be provided to the Econometric Engine 104 (step 204). Although not illustrated in this particular embodiment, the Econometric Engine 104 may also receive demand group information from the Auto Demand Group Generator 150. The Econometric Engine 104 processes the analyzed data, in light of the demand groups, to provide demand coefficients 128 (step 208) for a set of algebraic equations that may be used to estimate demand (volume sold) given certain marketing conditions (i.e., a particular store in the chain), including a price point. The demand coefficients 128 are provided to the Optimization Engine 112 (step 212).

Additional processed data from the Econometric Engine 104 may also be provided to the Optimization Engine 112. The Financial Model Engine 108 may receive processed data (step 216) and processed data from the Econometric Engine 104. This data is generally cost related data, such as average store labor rates, average distribution center labor rates, cost of capital, the average time it takes a cashier to scan an item (or unit) of product, how long it takes to stock a received unit of product and fixed cost data. The Financial Model Engine 108 may process all the received data to provide a variable cost and fixed cost for each unit of product (or by demand group) in a store (step 220). The processing by the Econometric Engine 104 and the processing by the Financial Model Engine 108 may be done in parallel. Cost data 136 is provided from the Financial Model Engine 108 to the Optimization Engine 112 (step 224). The Optimization Engine 112 utilizes the demand coefficients 128 to create a demand equation. The optimization engine is able to forecast demand and cost for a set of prices to calculate net profit. The Stores 124 may use the Support Tool 116 to provide optimization rules to the Optimization Engine 112 (step 228).

The Optimization Engine 112 may use the demand equation, the variable and fixed costs, the rules, and retention data to compute an optimal set of prices that meet the rules (step 232). For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules When profit is maximized, it may be maximized for a sum of all measured products.

Such maximization, may not maximize profit for each individual product, but may instead have an ultimate objective of maximizing total profit. The optimal (preferred) set of prices may be sent from the Optimization Engine 112 to the Support Tool 116 so that the Stores 124 may use the user interface of the Support Tool 116 to obtain the optimal set of prices. Other methods may be used to provide the optimal set of prices to the Stores 124. The price of the products in the Stores 124 are set to the optimal set of prices (step 236), so that a maximization of profit or another objective is achieved. An inquiry may then be made whether to continue the optimization (step 240).

Each component of the Price Optimizing System for Business Planning 100 will be discussed separately in more detail below.

II. Auto Demand Group Generator

A. System

Figure 21:
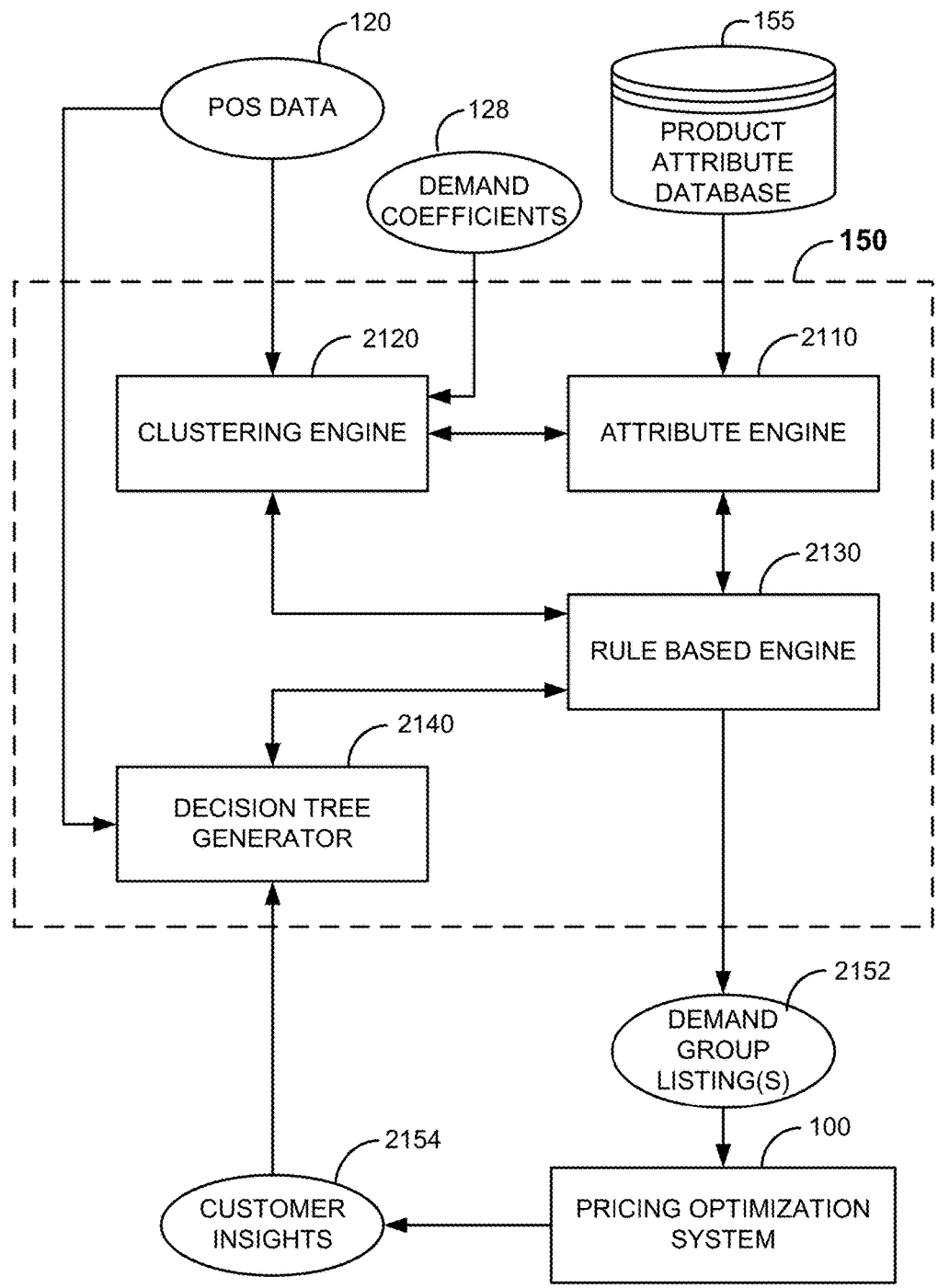
FIG. 21 is an example of one embodiment of a more detailed schematic view of the auto demand group generator in accordance with some embodiment of the present invention.

Proceed now to FIG. 21, which provides a more detailed view of the Auto Demand Group Generator 150. The Auto Demand Group Generator 150 receives data 120 from the Stores 124. The data 120 may be raw data generated from cash register data, which may be generated by scanners used at the cash registers. Existing Demand Coefficient Data 128 may likewise be received from the Econometric Engine 104, when available. Product listings may also be received by the Auto Demand Group Generator 150 (not shown). Product listings may include store inventory lists, catalog products, trial product lists and customizable product lists. In some embodiments, the system may be provided a product list, such as an existing store inventory, and said product list may be further customized by a user to include new products which are being considered for inclusion in the product line.

Lastly, the Auto Demand Group Generator 150 may access a Product Attribute Database 155 for product attribute information. Often the product attribute information includes a serial number, item identification number (such as a UPC or SKU), and a brief natural language tag describing the item. An example of the description of the product may include a phrase such as "milk, chocolate, 8 oz." Often the product descriptions include abbreviations due to space constraints for the description text. For example, the term "power mixers" may be truncated to "pwr mxr".

The Auto Demand Group Generator 150, in the illustrated embodiment, may include a Clustering Engine 2120 coupled to an Attribute Engine 2110 and a Rule Based Engine 2130. A Decision Tree Generator 2140 may additionally couple to the Rule Based Engine 2130. The Clustering Engine 2120 and Decision Tree Generator 2140 may each access the Point of Sales (POS) Data 120. The Clustering Engine 2120 may likewise receive the available Demand Coefficients 128 and Loyalty Data 122. The Attribute Engine 2110 may access the Product Attribute Database 155. The Rule Based Engine 2130 may generate and output Demand Group Listings 2152 to the Optimization System 100. The Optimization System 100 may then generate Customer Insights 2154 after the optimization. These Customer Insights 2154 may be re-fed into the Decision Tree Generator 2140 for fine tuning of the decision trees.

The Attribute Engine 2110 may first identify and decode the descriptions of products from the Product Attribute Database 155 to generate machine readable attribute data for each product. This data may be fed to the Clustering Engine 2120 for generation of product clusters. Meanwhile, the Decision Tree Generator 2140 may generate a decision tree for the product lists. Decision trees model a consumer's decision making process at the point of decision. Decision trees may include binomial tree structures in some embodiments.

The product clusters and decision trees may be provided to the Rule Based Engine 2130, where user defined and preset rules may be applied to the product clusters. The Rule Based Engine 2130 may then generate the Demand Group Listings 2152.

1. Attribute Engine

Figure 22:
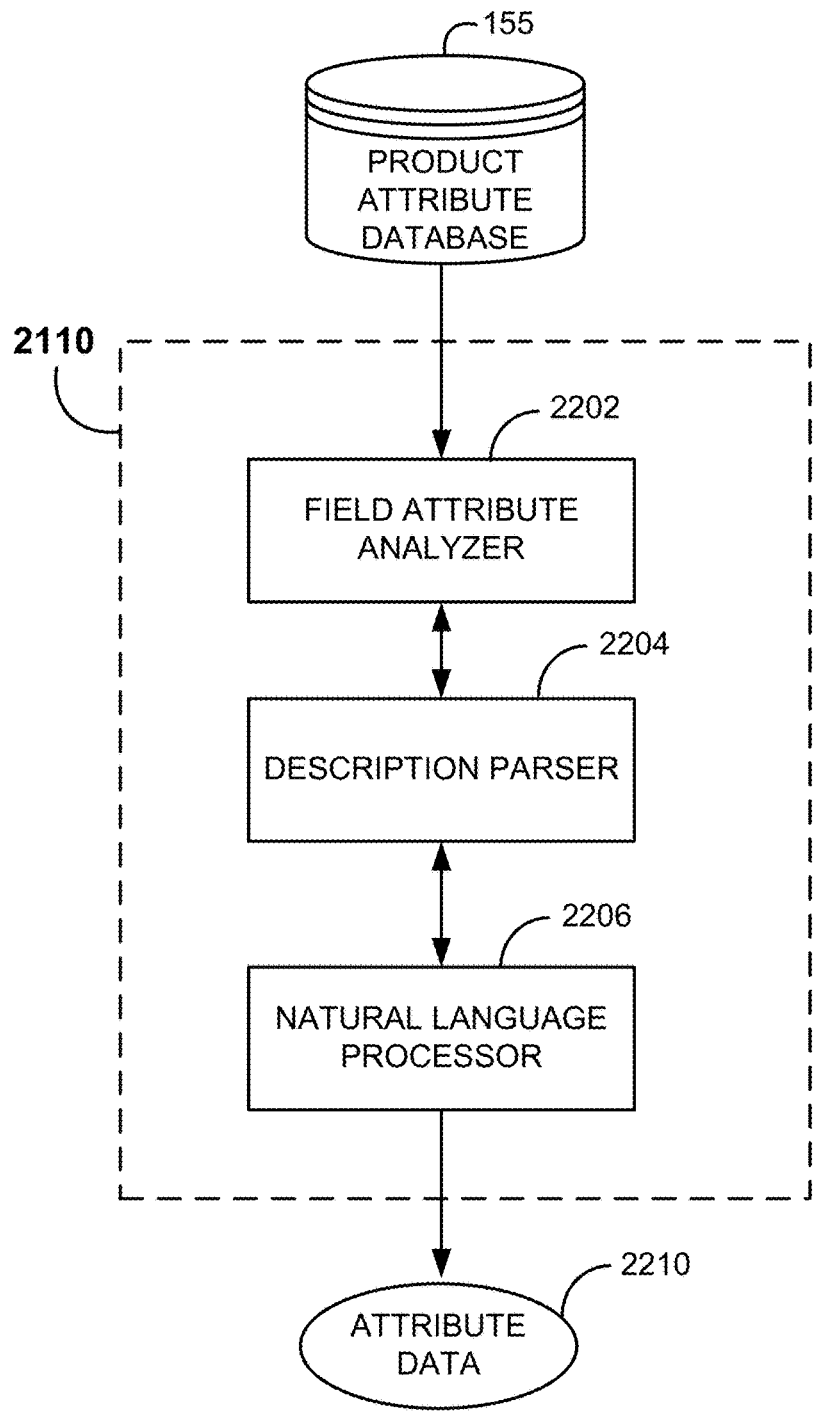
FIG. 22 is an example of one embodiment of a more detailed schematic view of an attribute engine of the auto demand group generator.

FIG. 22 provides a more detailed illustration of one embodiment of the Attribute Engine 2110. The Attribute Engine 2110 is shown comprising a Field Attribute Analyzer 2202, a Description Parser 2204 and a Natural Language Processor 2206. Again, the Product Attribute Database 155 is accessed by the Field Attribute Analyzer 2202 of the Attribute Engine 2110. The Field Attribute Analyzer 2202 may extract text and other data from the product attribute listing related to product descriptions. This includes description text, brand information, sizing information, manufacturer data, ID, and flavor. In some embodiments, this extracted information may be saved as a supplemental file which is capable of being updated as new product information becomes available. In some embodiments, the Field Attribute Analyzer 2202 may include functionality for replacement of known abbreviations, slang and shorthand for normalized text.

The extracted description information is then provided to the Description Parser 2204 for textual parsing. In some embodiments, description text parsing may be sophisticated enough to perform contextual analysis. In some alternate embodiments, the parsing step may simply include separation of individual words and elimination of 'common' filler words, such as 'is', 'the', 'and', 'it', and 'a'.

The parsed language may then be provided to the Natural Language Processor 2206 for analysis. Again the Natural Language Processor 2206 may be advanced enough to, in some embodiments, perform syntactical analysis and contextual analysis of the language. In some alternate embodiments, the Natural Language Processor 2206 may simply annotate the parsed words with meaningful information data. Thus, a descriptor term like 'juice' may be annotated with information such as 'beverage', 'sweet' and 'noncarbonated'. The application of meaning to descriptors may aid in downstream matching of product for grouping. The final output of the Attribute Engine 2110 is Attribute Data 2210 which is provided to the Clustering Engine 2120 for product clustering.

2. Clustering Engine

Figure 23:
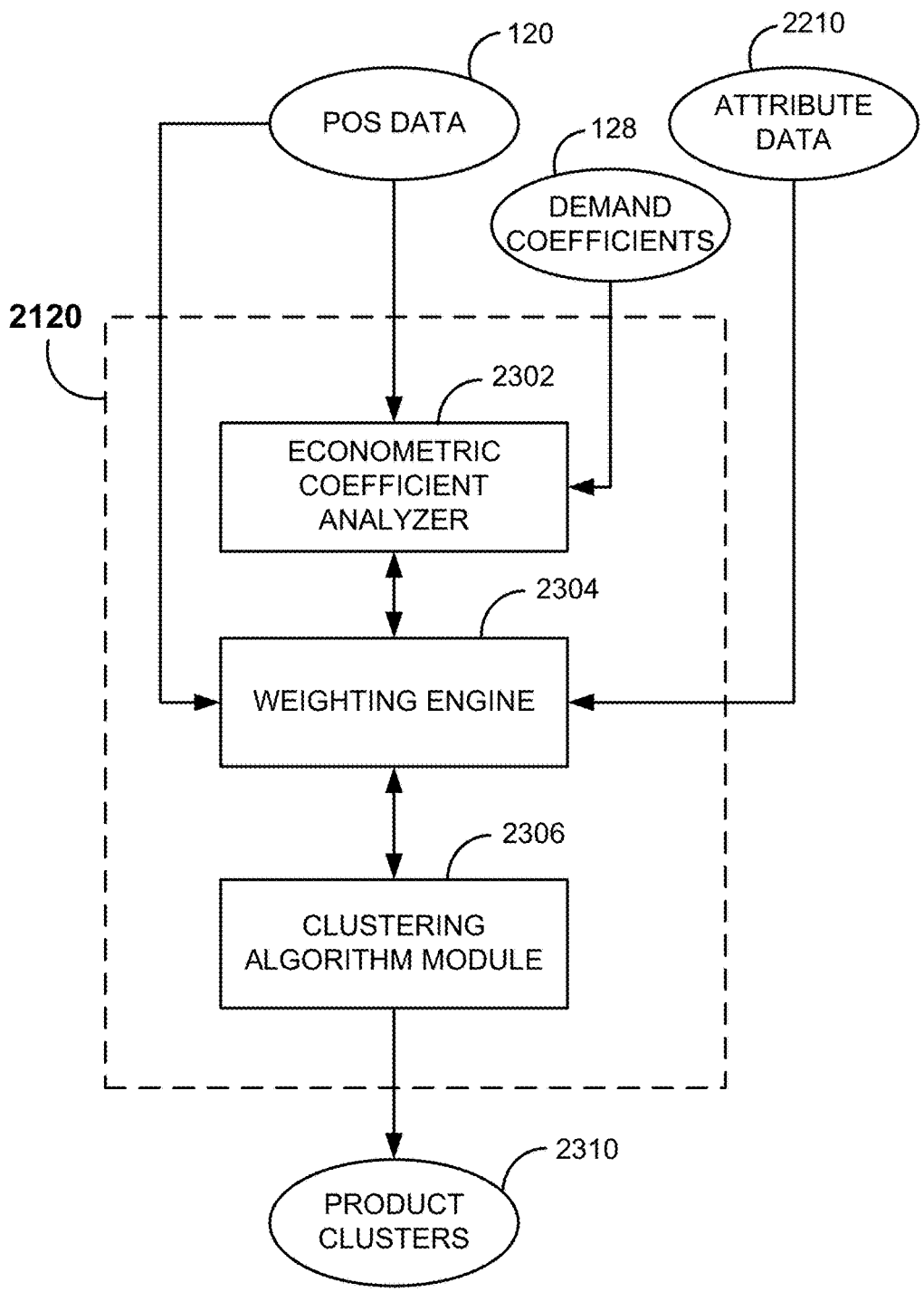
FIG. 23 is an example of one embodiment of a more detailed schematic view of a clustering engine of the auto demand group generator.

FIG. 23 provides a more detailed illustration of one embodiment of the Clustering Engine 2120. The Clustering Engine 2120 may be seen receiving a number of inputs, including the POS Data 120, Demand Coefficients 128, and Attribute Data 2210. Additionally, Loyalty Data 122 may be provided to the Clustering Engine 2120. The Clustering Engine 2120 may include an Econometric Coefficient Analyzer 2302, a Weighting Engine 2304 and a Clustering Algorithm Module 2306. The Econometric Coefficient Analyzer 2302 performs the first analysis for product clustering by identifying commonalities between the demand coefficients known for previously modeled products. Likewise, purchasing behavior associated with the products, gleaned from the POS Data 120, may be identified by the Econometric Coefficient Analyzer 2302.

An example of analyzing purchasing behavior will now be described in greater detail. Said example is provided in a simplified form in order to provide clarity and simplicity to the example. Note that the process illustrated in this example may be modified and expanded as required to handle the complexity of products and purchasing behaviors seen in real world settings.

The example begins by receiving a series of transactions from the POS data. Transactions which are linked via loyalty data may be attributed to a single purchasing entity (often referred to as "household"). Many retailers require usage of a 'rewards card' or membership in order to access particular savings and discounts. Further, some retailers require the membership for patronage at all (i.e., Costco®). These membership and rewards programs enable the retailer to collect identification data and track customer purchasing behaviors. This data may generally be included in the term "loyalty data". Additional information, such as credit card information, banking information and survey information may likewise be included in loyalty data. A table may be generated for customer transactions in a given time period and a given store. An example of such a transaction table is provided below at Table 1.

EXAMPLE TABLE 1

| Date | ID | Item 1 | Item 2 | Item 3 | ... Item N |
|---|---|---|---|---|---|
| Jan. 22, 2009 | 123 | 2× Coke 12 pk | 8 oz pace salsa | 12 roll tissue | 2× sponge |
| Jan. 29, 2009 | 456 | 1× 24 Coke | 12 oz yogurt | NA | NA |
| Feb. 26, 2009 | 123 | 6 pk Pepsi | NA | NA | NA |
| Mar. 5, 2009 | 123 | 2× Coke 6 pk | 2 gal. milk | 1× Time Mgz | 8 oz soft soap |
| ... | | | | | |
| Apr. 4, 2009 | 456 | 4× 2 L Coke | 1.4 lb orange | 2× 5 lb ice | NA |

The transaction table provided at example Table 1 indicates two purchasing entities (ID 123 and 456) within the first quarter of 2009. Each item of these transactions are provided in the table. From this table the number of transactions which the purchaser's substitute products for one another may be readily identified. In this simplified example, purchaser ID 123 may be seen purchasing 2 items of 12 pack Coke®. Then the purchaser, on the following trip purchases a 6 pack of Pepsi® product. The following trip 2 quantities of 6 pack Coke® products are purchased. This behavior may be tracked throughout the time period, until the last transaction is reached. This transition from one product to another, for a given time period, may be logically stored within a matrix. This may be referred to as a 'transition matrix'. An example of a transition matrix is provided below at Table 2.

EXAMPLE TABLE 2

| | 12 pack Coke | 6 pack Coke | 2 liter Coke | ... 2 liter Pepsi |
|---|---|---|---|---|
| 12 pack Coke | $N_{1,1}$ | $N_{1,2}$ | $N_{1,3}$ | $N_{1,n}$ |
| 6 pack Coke | $N_{2,1}$ | $N_{2,2}$ | $N_{2,3}$ | $N_{2,n}$ |
| 2 liter Coke | $N_{3,1}$ | $N_{3,2}$ | $N_{3,3}$ | $N_{3,n}$ |
| ... | | | | |
| 2 liter Peps | $N_{n,1}$ | $N_{n,2}$ | $N_{n,3}$ | $N_{n,n}$ |

In the example Table 2, the sum number of transitions between any given product and another product are provided within the matrix for the given time period. Thus, a type of "heat map" is formed which indicates which products are often purchased as substitutes for one another. Clustering of products may then be performed utilizing the transition matrix.

The Weighting Engine 2304 may then receive the Attribute Data 2210 and the coefficient analysis to generate weighing factors for each attribute. Weighing factors may indicate to what degree any particular attribute may effect clustering of the products. Thus, products sharing common attributes which are highly weighted are more likely to be clustered than products sharing less heavily weighted attributes. For example, 'size' attributes may be weakly weighted whereas 'flavor' attributes may be more heavily weighted when dealing with soda.

The weighting factors may be provided to the Clustering Algorithm Module 2306 for generation of Product Clusters 2310. The clustering algorithms utilized here may incorporate the weighing factors. The Product Clusters 2310 may be thought of as raw demand groups, subject to user rules.

Clustering may be performed by any of hierarchy clustering, model based clusters, EM algorithms, locality-sensitive hashing, and k-means clustering, to name a few.

In some embodiments, the clustering algorithms may provide a clustering of a particular product under an acceptable confidence threshold. This occurs when the product attribute information is insufficient to accurately determine which group to assign the given product to. The confidence threshold required to place a product in a cluster may be user defined in some embodiments. Products which cannot be clustered may be tagged as requiring further user input to determine which demand group they belong. In some alternate embodiments, these products may be exempted from a demand group, and rather be modeled for separately.

3. Rule Based Engine

Figure 24:
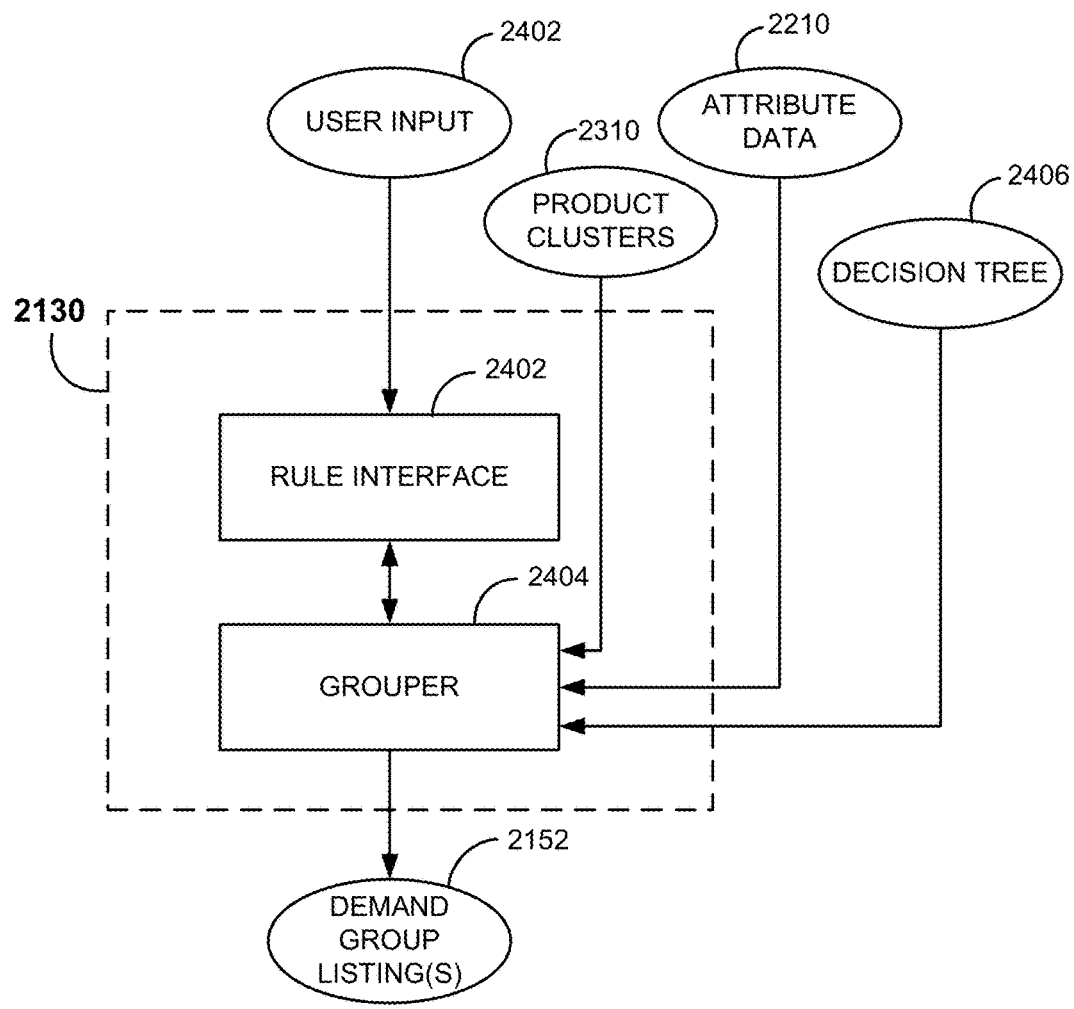
FIG. 24 is an example of one embodiment of a more detailed schematic view of a rule based engine of the auto demand group generator.
Figure 25A:
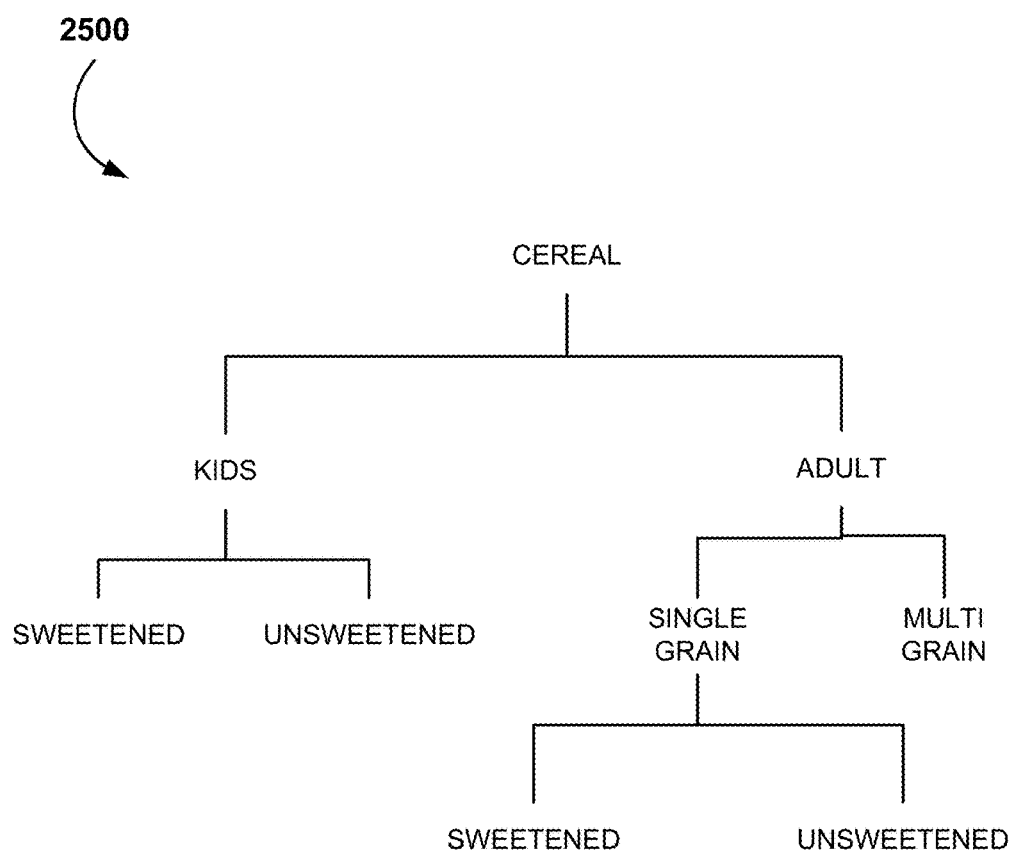
FIGS. 25A and 25B are two example illustrations of decision trees in accordance with some embodiments of the present invention.
Figure 25B:

FIG. 24 provides a more detailed illustration of one embodiment of the Rule Based Engine 2130. The Rule Based Engine 2130 may be seen receiving a number of inputs, including the Attribute Data 2210, Product Clusters 2310, User Input 2401, and at least one Decision Tree 2406. The User Input 2401 may be inputted at a Rule Interface 2402. The Rule Interface 2402 may include any known interface device, but in some embodiments it may be desirable to have the Rule Interface 2402 be a secure web-accessible portal.

Examples of possible rules include prioritizing division of products by size, brand or type when generating demand groups. Additionally, multiple division methods may be simultaneously prioritized in some embodiments of the invention.

Thus for example, a clustering algorithm may be applied to individual products. Weights, dependent upon the rules, may be incorporated into the clustering algorithms in order to ensure that demand groups adhere to the user defined rules. For example, clustering may be performed by minimizing the Sum of the Squared Error (SSE) of a data point scatter. The SSE may be provided as:

$$SSE = \sum_{i=1}^{K} \sum_{x \in C_i} dist(c_i, x)^2$$

where, $$C_i = \frac{1}{m_i} \sum_{x \in C_i} x$$

x is an object,
$C_i$ is the $i^{th}$ cluster,
$c_i$ is the centroid of cluster $C_i$
$m_i$ is the number of objects in the $i^{th}$ cluster, and
K is the number of clusters.

The object (x) is the product, which may be provided as a function including attributes and weights. Thus, for example, x could be provided as:

$$x = \sum_{n=1}^{P} w_n v_n$$

where,
P is the total number of attributes,
$w_n$ is the weight given to the $n^{th}$ attribute, as indicated by the rules, and
$v_n$ is the value of the $n^{th}$ attribute.

Alternative distance metrics could also be used, for example the distance could generally be defined between points $c_i$ and x as:

$$dist(c_i, x; p) := \|c_i, x\|^p$$

Where p>0, is a positive exponent. When p=2, it translates to the familiar Euclidean norm. The norm ($\|.\|^p$) function is well defined for multi-dimensional vectors as follows:

$$\|c_i, x\|^p = \sqrt[p]{\sum_{k=1}^{n} (c_{i,k} - x_k)^p}$$

Where $x_k$ represents the k-th component of object x.

Moreover, here are yet other examples of the distance metrics that may be utilized in some embodiments of the present invention:

Manhattan Metric=$dist(x, c_i, 1)$

Discrete Metric: $d(x, c_i)=0$ if $x=c_i$ and $d(x, c_i)=1$

Mahalanobis Distance: $d(\vec{x}, \vec{y}) = \sqrt{(\vec{x}-\vec{y})^T S^{-1} (\vec{x}-\vec{y})}$.

Where $(.)^T$ represents the transpose function on the vector and S is a n×n square matrix (usually covariance matrix of $\vec{x}$ and $\vec{y}$), but it could be some other functional of $\vec{x}$ and $\vec{y}$. Finally $S^{-1}$ represents the inverse of a matrix.

Additionally, some embodiments of the invention could use almost any function that satisfies the definition of a distance metric. That is, the distance metric must satisfy the following conditions:

$d(x, c_i) \geq 0$ (non-negativity)

$d(x, c_i)=0$ if and only if $x=c_i$ (identity of indiscernibles)

$d(x, c_i)=d(c_i, x)$ (symmetry); and $d(x, z) \leq d(x, c_i) + d(c_i, z)$ (triangle inequality)

Also note that the distance may be computed between an observation x and a pre-existing set S, where the dist is generically defined as:

$dist(x, S; p; f) = dist(x, f(s); p)$, where $s$ belongs to $S$ where f(s) could be defined as "centroid of S" or "point in S that is closest to x" or other appropriate definitions. The dist( ) is same as before with p>0 being a positive exponent on the distance.

Note that the above equations are provided as examples only and are not intended to limit the present invention. Alternate clustering methods and equations may be utilized in various embodiments of the present invention, as is applicable. Additionally, note that some embodiments of the present invention may also support weighted version of the distance metric, where weight vector w is provided. In this case, the weighted metric may be provided as:

$dist(x, c_i, p, w) = dist(w \cdot x, w \cdot c_i; p)$, where w·x represents element-wise multiplication of components of the weight vector w with the vector x.

The Grouper 2404 may apply demand rules, determined from the user input, to the Product Clusters 2310 and/or the Decision Tree 2406 to determine the Demand Group Listings 2152.

B. Decision Tree Example

Decision trees may be particularly helpful in identifying demand groups and/or used to place products into particular demand groups. The decision trees may be generated for any level of customer granularity as is desired given available computational resources. Thus, a general decision tree may be generated for the entire customer base, in some embodiments. Alternatively, decision trees may be made for each customer segment. Given large ticket items, relatively few customers and/or ample available computational resources, it is even possible to generate customized decision trees catered to each customer.

The Decision Tree Generator 2140 may receive transaction log data and product attribute data. The Decision Tree Generator 2140 may generate a decision tree from the received data. A decision tree, for purposes of this application, may provide a logical mapping of a customer's decision process when selecting which product to logical mapping of how a consumer makes a purchasing decision at the point of purchase.

In some embodiments, a decision tree may take the form of a binary heap data structure. Of course, other decision tree forms may be utilized. For example, instead of a binary tree, the decision tree may have any number of children under any particular parent node.

The system may, in some embodiments, receive a prepopulated decision tree rather than having the Decision Tree Generator 2140 generate decision trees. Such an existing decision tree may be supplied by the retailer, a third party research group, a manufacturer or any other portion of the Auto Demand Group Generator 150. Ultimately the source of the decision tree is inconsequential as later processing is adaptable enough to use a variety of decision trees regardless of form or source.

Tree crawling algorithms or other relational algorithms may be utilized to determine how close any particular leaf (product) in the tree is to any other leaf. In a simplistic example, a simple stepwise function may be utilized to determine closeness of any particular product. Thus, sibling leafs in the tree may have two degrees of separation (child one to parent node, and from parent node to child two). More complicated measures are also possible, where leafs at different heights of the tree are considered further apart than products on the same tree level.

FIG. 25A is an example illustration of a decision tree, shown generally at 2500. This example decision tree is a heaped binary tree. This particular example decision tree may provide a model of how a typical consumer approaches the selection of a cereal at the point of decision making.

For many consumers, the first decision process is determining if a cereal purchase will be a kids' cereal or an adult cereal. The decision to purchase a kids' cereal may be further refined by a decision between sweetened cereal (Coco Puffs® for example) and unsweetened cereal (Cheerios® for example).

On the other hand, a customer purchasing an adult cereal may make the next decision between single grain cereals and multigrain cereals. If the customer wants a single grain cereal, the decision process may continue by choosing between sweetened cereals or unsweetened cereals.

The decision tree may be particularly useful in determining the impact on product assortments, and for modeling demand impact between products. Thus, for example, a retailer debating altering their product assortment by introducing a new adult single grain unsweetened cereal (let's call it Super Rice Nuggets) may determine the effect this change in assortment may have on overall business sales. Other single grain unsweetened cereals, such as shredded wheat, may experience reduced sales. Likewise, products close to the new product on the decision tree may also experience reduced sales, such as Special K®, a sweetened single grain adult cereal.

As distance from the new product increases in the decision tree, the impact of the product's inclusion in the assortment will decrease. Thus, for our example decision tree, the addition of Super Rice Nuggets will have diminishing effects on multigrain adult cereals, and very little impact on kid's cereals.

The impact a change in assortment has on other products may be further refined by referencing the demand coefficients between products in an existing assortment. Crowded product lines, such as cereals, may have large elasticities between products. Thus, a new cereal may have a greater effect on other cereal products than the addition of a new snack item has on other snack items (assuming the elasticities between snack items are less than between cereals).

Additionally, a decision tree measures the respective "closeness" between products. Thus, leafs on the decision tree may be deemed sufficiently close as to belong to the same demand groups.

Thus, the decision tree provides a large amount of utility to the system in the generation demand groups by indicating which products are substitutable in the consumer's view. Further, the number of demand groups that should be generated given a set of products may be readily identified through analysis of the decision tree.

Note that the provided decision tree has been dramatically simplified in the interest of clarity. Actual decision trees may include many more layers and/or branches. Other product attributes may be considered in these decision trees as well, such as product size, colors, flavors, brands and the like. Functional decision trees may include many thousands of products and hundreds if not thousands of decision nodes.

A more complex example of a decision tree may be seen in reference to FIG. 25B. This decision tree may be seen as having a variety of depths and connectivity between products. A 'height' measurement may be utilized, in some embodiments, to indicate relative closeness of products.

C. Methods of Demand Group Generation

FIGS. 26 to 31 provide example flow diagrams for some embodiments of the demand group generation process. The example process begins at step 2610 of FIG. 26 where demand group data is received. This demand group data may include POS data, transaction log data, product information, existing demand coefficients, and existing decision trees, in some embodiments.

Then, at step 2620, the process may determine product attributes from the received demand group data. Often the determination of product attributes relies upon description data found within the product information. The products may then be clustered at step 2630, utilizing similarities in the product's attributes. Clustering of products may be performed according to a user defined threshold of similarity between product attributes. Products that cannot be readily clustered into a single cluster (for example a 'spork' may have attributes akin to a spoon and a fork in equal proportions) or that do not fit into any cluster at a sufficiently high confidence level may be flagged for additional user input. This ensures that products that are difficult to categorize do not end up in an incorrect demand group, but rather has a user provide input into which demand group the product belongs to.

Additionally, a decision tree for the product listing may be generated, at step 2640. As indicated earlier, in some embodiments the decision tree may be preexisting or may be provided from a third party (such as a manufacturer). In these cases there is no need to independently generate a decision tree. Note, however, that in some embodiments the decision tree(s) may be readily updated to reflect changes in product offerings or as new decision making data becomes available.

Rules regarding the grouping of products may likewise be generated at step 2650. In some embodiments, particular rules may be default rules preloaded within the Auto Demand Group Generator 150. For example, there may be rules limiting the maximum number of products in any given demand group. Likewise, in some embodiments, the rules may be generated by the user via a user interface. These rules may include natural language based rules, as well a Boolean logic rules. Thus a user may, for example, indicate that premium brands (such as Clorox® and Tide®) are not to cohabit demand groups with "discount" brands, such as a house brand.

Lastly, the rules generated may be applied to the product clusters, the decision tree or a hybrid approach in order to generate the demand groups, at step 2660. These demand groups may be provided to downstream price optimization systems for the generation of optimized prices, as will be discussed in more detail later in this application.

Figure 27:
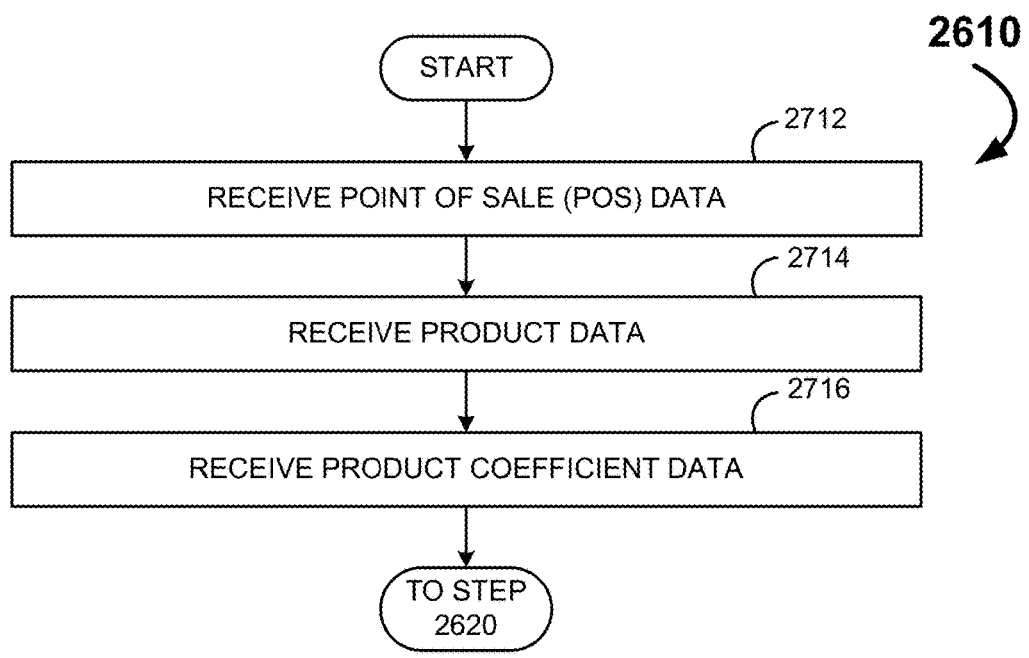
FIG. 27 is an example flow chart for the receipt of demand grouping data for the generation of demand groups in accordance with some embodiments of the present invention.
Figure 28:
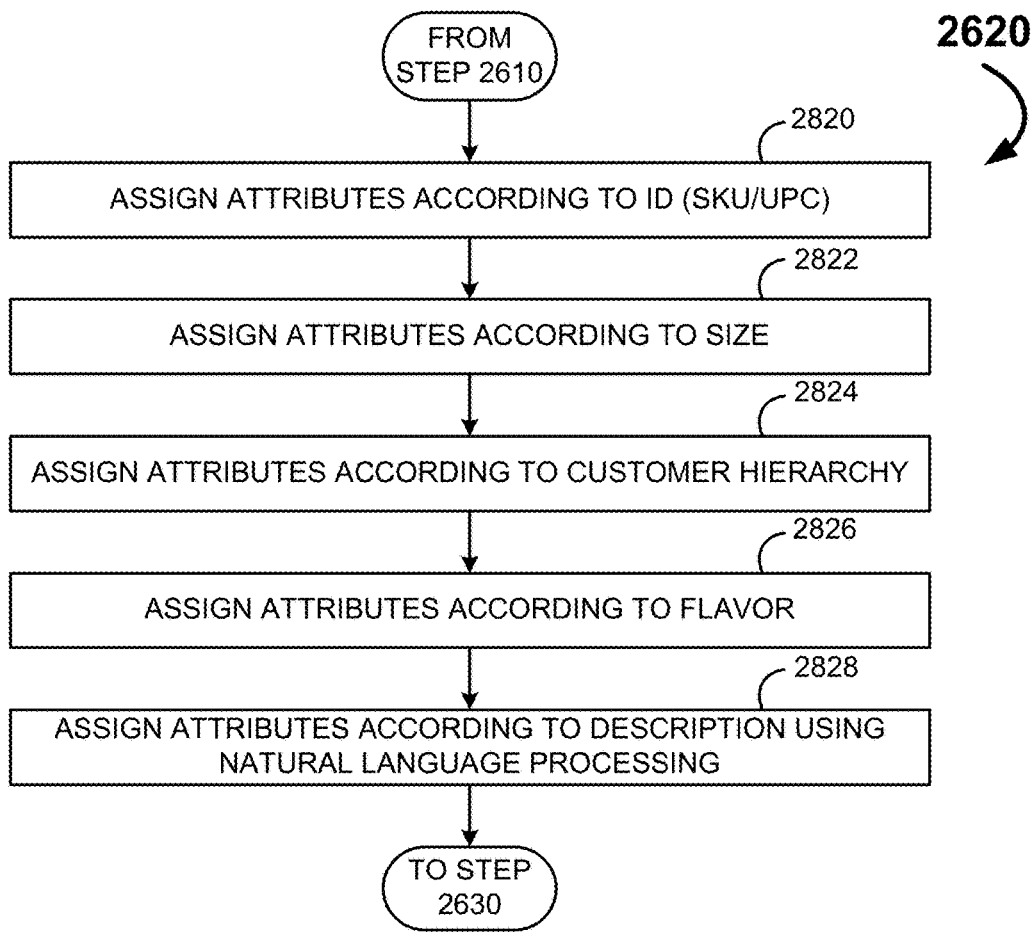
FIG. 28 is an example flow chart for the determination of product attributes for the generation of demand groups in accordance with some embodiments of the present invention.

Proceeding to FIG. 27, the step of receiving demand group data is provided in greater detail, as is indicated at 2610. Here, at step 2712 the point of sales (POS) data is received. POS data may be received as a live feed from cash registers (particularly in an e-commerce setting), or more commonly may include compiled transaction log data.

Product information may also be received at step 2714. As indicated above, product information typically includes at least one of an identifier, such as a Shop Keeping Unit (SKU), brand information, size information, unit count, storage requirements and a text description. The text descriptions are typically short, and may be truncated and abbreviated due to field size constraints.

Lastly, when available, existing demand coefficients for the given products may be received, at step 2716. Demand coefficients may be known for a given product due to prior demand modeling processes or may be provided from the store or manufacturer when known.

In addition to these typical demand grouping data type, additional data may be received which is not illustrated but which is useful in the generation of demand groups. For example, where available, business segments generated by analysts may provide insights into the relatedness of products. Likewise, panel and consumer opinion data may be particularly helpful in determining which products are highly substitutable.

Figure 26:
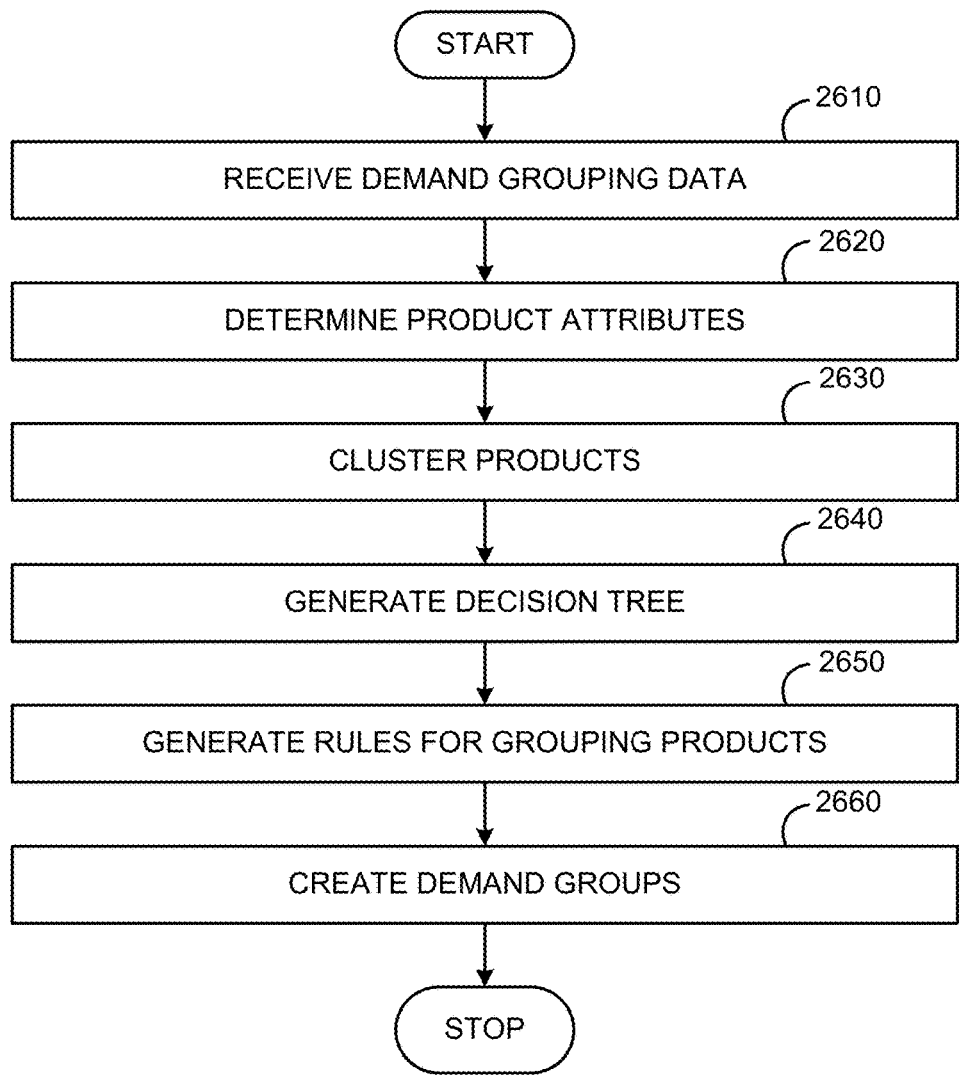
FIG. 26 is an example flow chart for the generation of demand groups in accordance with some embodiments of the present invention.

After receiving the demand group data, the process may return to step 2620 of FIG. 26, which includes the determination of product attributes. Some example of this sub-process is further illustrated in more detail at FIG. 28. Here the system may assign attributes to each product based upon information gained from the demand grouping data.

For example, at step 2820, attributes may be assigned to the product based upon identification (such as SKU). This may include a lookup table matching particular SKU's to known attributes. Likewise, attributes may be assigned to a product dependent upon sizing, at step 2822. Sizing attributes may include numerical volume, weight or unit counts. More useful in many circumstances, however, is the assignment of more intuitive sizing classifications, such as 'small', 'medium' and 'large'. Thus, a 12 oz. milk product may be given an attribute of 'small', a 1 gallon milk jug is 'medium', and a 2 gallon milk container may be classified as 'large'. User input may be requested when products do not clearly fit within a set size level. For example, a 28 oz. container of milk product may elicit a user input request as to whether the product is a small or medium sized milk product.

Additionally, attributes of a product may be assigned based upon customer hierarchy, at step 2824. Thus items a customer considers to be of average quality may be assigned a 'standard' attribute. Contrary, high quality items may be assigned a 'premium' attribute, in some embodiments of the invention.

Flavor of the product may also be grounds for an attribute distinction, at step 2826. This metric is obviously applicable to a grocery store or other retailer of consumable goods. Likewise, equally useful attributes may be applied to products in different retail settings. For example, an appliance retailer may rather have attributes for the appliances based upon color or power source (gas or electric). Thus, it is considered within the scope of this invention to tailor the attribute generation step to any particular attributes relevant to the products being sold at a given retailer.

Lastly, at step 2828, attributes may be assigned to the products based upon natural language processing of the product descriptions received. The process then concludes by returning to step 2630 of FIG. 26.

Figure 29:
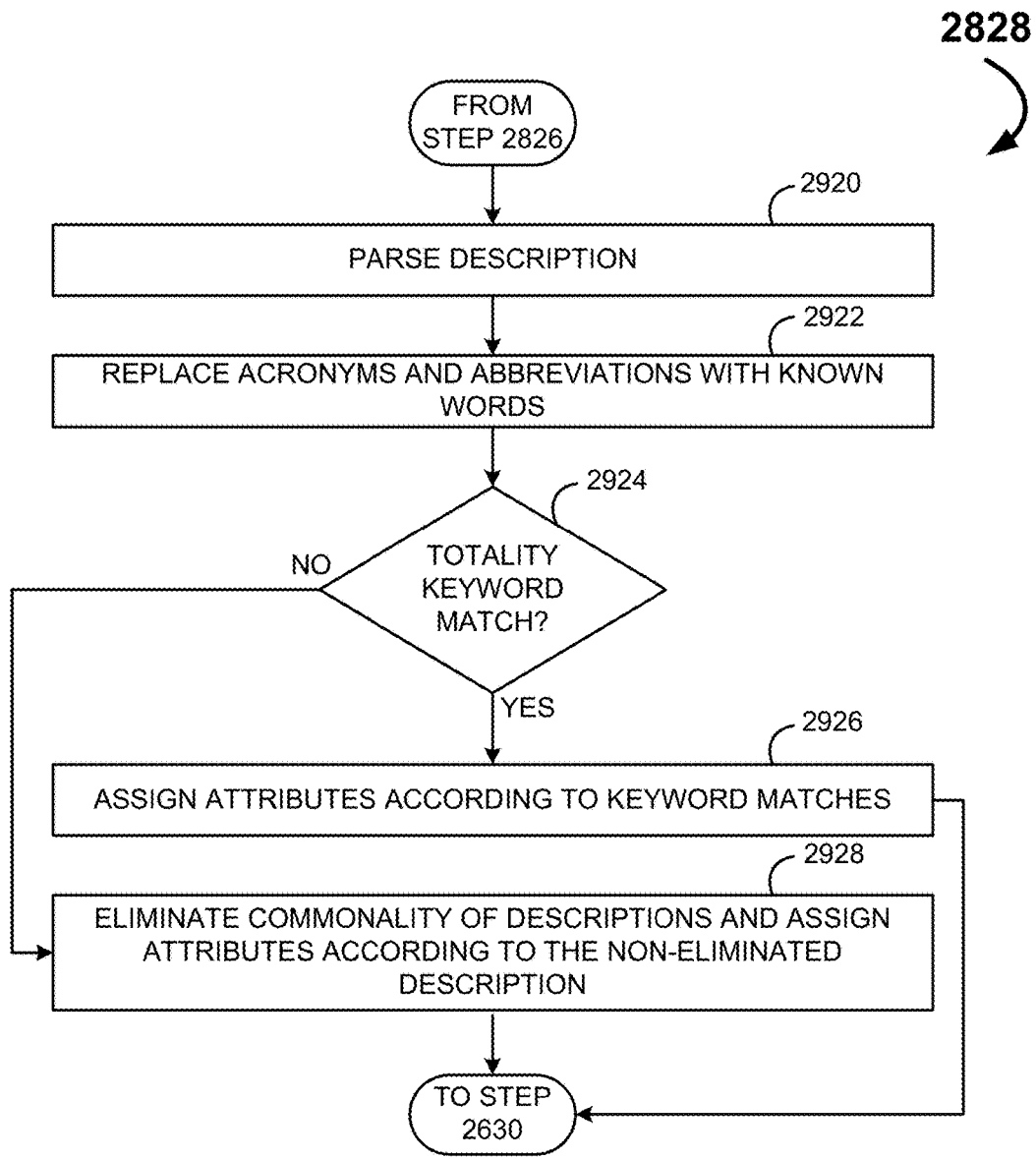
FIG. 29 is an example flow chart for the natural language processing utilized in the generation of demand groups in accordance with some embodiments of the present invention.

Proceeding to FIG. 29, one embodiment of the natural language attribute generation sub-process is provided in more detail, shown generally at 2828. Here the description for the attribute is parsed, at step 2920. As noted above, typical product descriptions include short text based comments briefly describing the product. Individual words of this description may be separated out during parsing for further analysis. Additionally, text phrases with known acronyms or abbreviations may be replaced with known words, at step 2922. In addition to a direct word replacement, the system may employ predictive programming similar to spell check algorithms to generate possible meanings for parsed terms which are unidentifiable. Thus, the term "whl chicken brst" may be recognized as meaning "whole chicken breast". Additionally, non-useful words may be eliminated from the descriptions. These words may include filler type words such as "a", "and", "it" and "this", to name a few.

After cleansing of the parsed descriptions, an inquiry may be made as to how to assign attributes to the products, at step 2924. This inquiry may, in some embodiments, include deciding between a totality keyword match, and assignment based upon descriptor differences.

In a totality match, attributes may be assigned to the products based upon matching keywords, as indicated at step 2926. Thus, for example "ball hammer" and "sledge hammer" may each be assigned the attribute "hammer" due to commonality. Further, products may be assigned synonymous attributes, such as "mallet" and "driver".

In assignment of attributes by descriptor differences, common terms may be eliminated between the descriptions of multiple products, at step 2928. The remaining terms may then be utilized to apply as attributes to the products. The elimination may be further tailored to require commonality by all descriptors or only minimum commonality. Thus, for example, assume a set of product descriptors includes "orange flavored soda", "grape flavored juice", and "cherry flavored soda". Here "flavored" is eliminated from the descriptions as it is common to all products. In some embodiments, the term "soda" may likewise be eliminated. In some alternate embodiments, it may be useful to retain "soda" as a descriptor as it is not common to all products.

Figure 30:
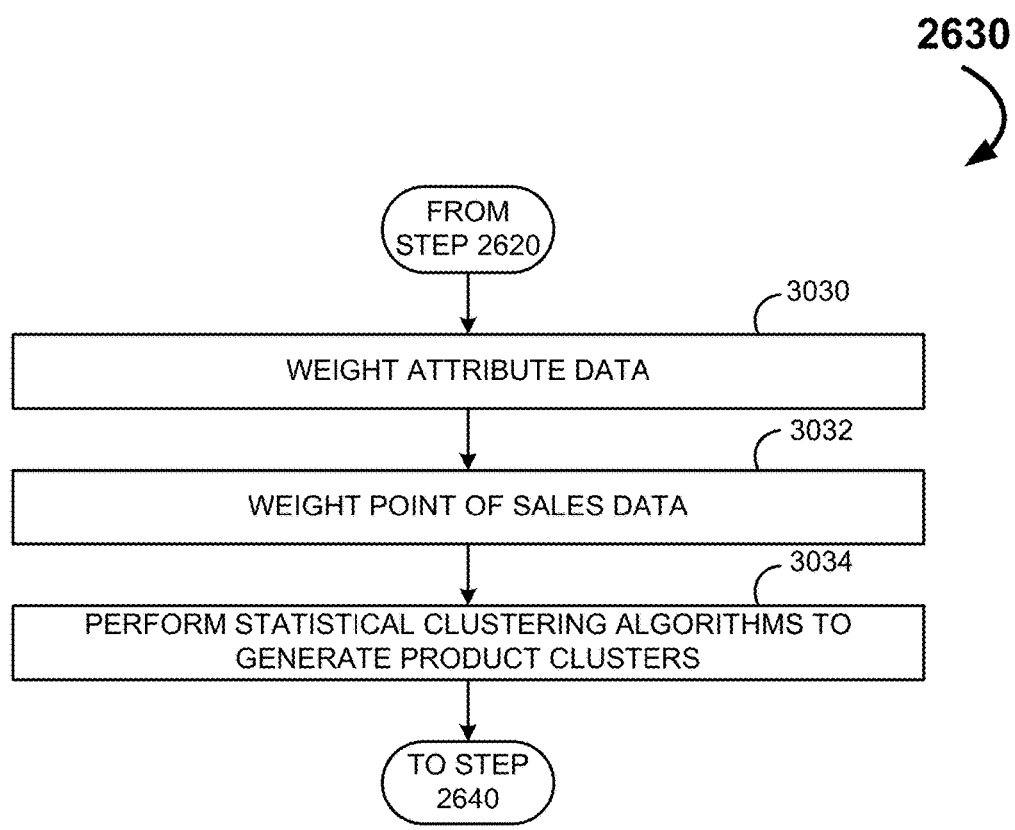
FIG. 30 is an example flow chart for product clustering for the generation of demand groups in accordance with some embodiments of the present invention.

After the natural language processing is completed, the process returns to step 2630 of FIG. 26, which includes clustering of products by attributes. Some embodiment of this clustering sub-process is illustrated in more detail at FIG. 30, shown generally at 2630.

The clustering sub-process begins by weighing attribute data by importance, at step 3030. Thus, in some retail settings, size of a product doesn't matter much, and yet flavor/color/material may be particularly important. An example of this may be spices. In some other settings, sizing may be paramount, and flavor/color/material may be inconsequential, such as for ladders.

Likewise, at step 3032, POS data and transaction data may be assigned weights dependent upon consumer or other metric. The weighted attribute information, transaction data, and any other relevant data (such as known demand coefficients and previous demand groups) may be input into clustering algorithms to perform statistical clustering of the products, at step 3034. These statistical clustering algorithms may group products by similarities between attributes. Clustering may be performed by hierarchy clustering, model based clusters, EM algorithms, locality-sensitive hashing, and k-means clustering, to name a few. Additionally, as mentioned above, the use of a transition matrix may be of particular use when clustering products by substitutability.

In some embodiments, confidence of how much a particular product belongs to a given demand group may be provided as a percentile. These percentiles may be compared to configurable thresholds in order to determine if further user input is desired. Products that cannot be clustered with the minimum levels of confidence required may then be flagged for user input as to where these products belong. After clustering products this sub-process ends by returning to step 2640 of FIG. 26.

Figure 31:
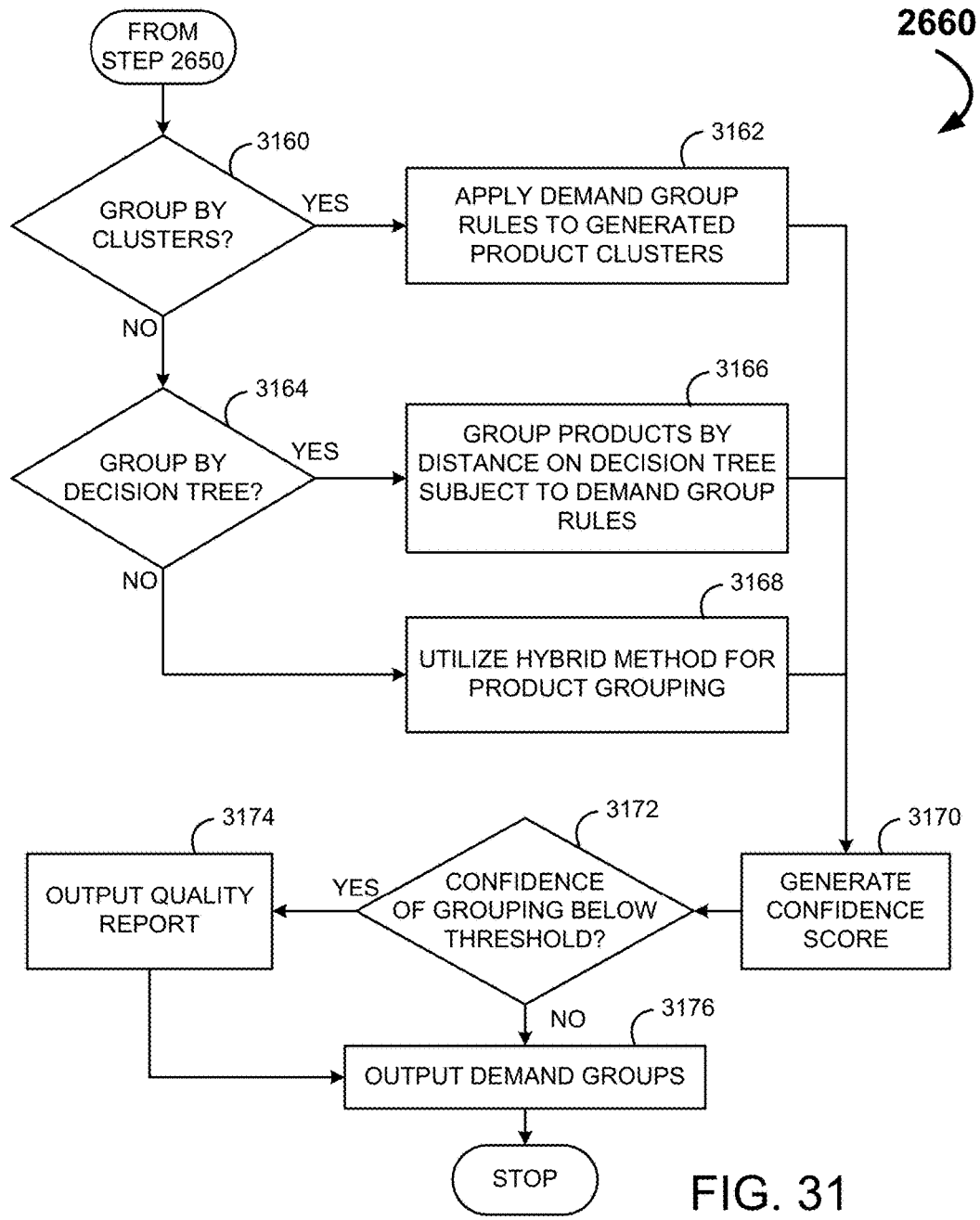
FIG. 31 is an example flow chart for the creation of demand groups for the generation of demand groups in accordance with some embodiments of the present invention.

FIG. 31 provides a more detailed flow diagram for one embodiment of creating demand groups of step 2660. Here an inquiry is made, at step 3160, whether to group products by clusters. If it is desirable to group by clusters then the process progresses to step 3162 where the demand group rules are applied to the clusters to generate the demand groups.

Otherwise, if grouping by clusters is not desirable, the process may continue to step 3164 where an inquiry is made whether to group products by decision tree. Grouping by decision tree may then be performed at step 3166, where distance between products is measured on the decision tree. This may utilize a tree crawling algorithm, or compile a distance matrix to determine relative "closeness" of products. Thus, products with sufficient levels of closeness may then be grouped into demand groups.

Lastly, if generation of demand groups by decision trees is not desirable, the process may continue to step 3168 where a hybrid method of clustering and decision tree analysis may be utilized to determine demand groups. In such an embodiment, the decision tree may be utilized to determine the total number of demand groups, for example.

The clusters may then be utilized, along with demand rules, to assign products to each of the determined demand groups.

After any of the foregoing methods of demand group generation are completed, the process may continue to step 3170 where a confidence score is generated for each product. The confidence score may be expressed as a percentage of confidence that the product has been accurately placed within its given demand group. This confidence score may be compared against a set threshold, at step 3172, to determine if further user input is warranted. The confidence threshold may be preset to a default, and may further be configured by a user, in some embodiments.

If a product's confidence score is below a threshold, the product may be flagged for inclusion in a quality report which is provided to the user, at step 3174. The user may utilize this quality report to manually update product demand groups. The demand groups may then be outputted, at step 3176, for use in downstream optimization processes.

III. Econometric Engine

Returning now to FIG. 3, which provides a more detailed view of the Econometric Engine 104. The econometric engine comprises an Imputed Variable Generator 304 and a Coefficient Estimator 308. The data 120 from the Stores 124 is provided to the Imputed Variable Generator 304. The data 120 may be raw data generated from cash register data, which may be generated by scanners used at the cash registers. Additionally, demand group data may be provided to the Imputed Variable Generator 304 from the Auto Demand Group Generator 150.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
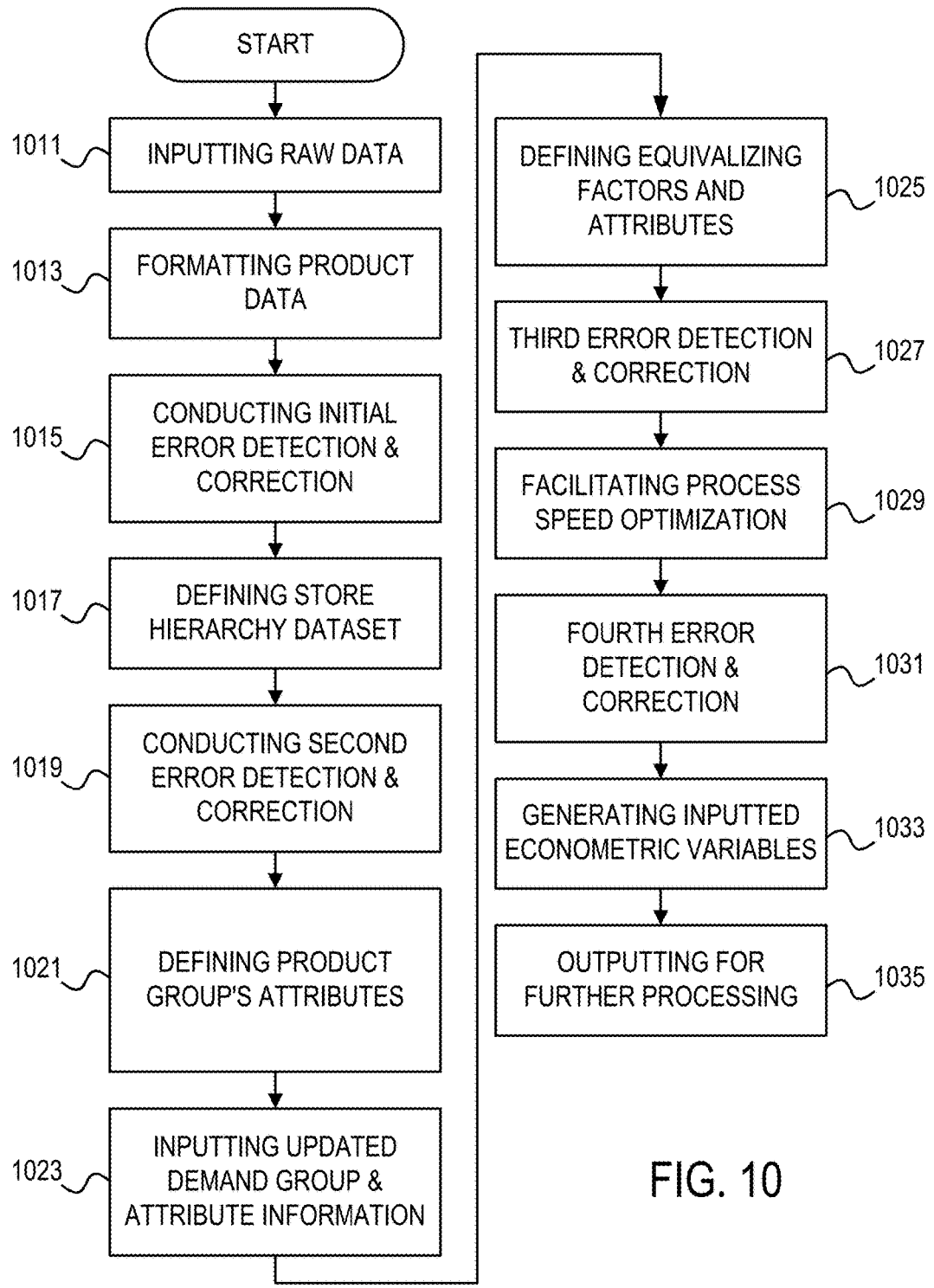
FIG. 10 is a flow chart depicting a process flow by which raw econometric data can be input, subject to "cleansing", and used to create an initial dataset which can then be used to generate imputed econometric variables in accordance with some embodiment of the present invention.

FIG. 10 illustrates a flowchart 1000 which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035). Likewise, such dataset correction and cleansing.

1. Initial Dataset Creation and Cleaning

The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject an initial error detection and correction step (Step 1015). Once the econometric data has been corrected, the store information comprising part of the raw econometric data is used in defining a store data set hierarchy (Step 1017). This is followed by a second error detecting and correcting step (Step 1019). In some embodiments, this is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

While this exemplary process of generating an initial dataset with cleansing is provided with some degree of detail, it is understood that the process for predicting customer loss and customer retention strategy generation may be performed with a variety of optimization systems. This includes systems where, for example, demand groups are not generated, and where alternative methods of data set generation are employed.

The process begins by inputting raw econometric data (Step 1011). The raw econometric data is provided by a client. The raw econometric data includes a variety of product information, including, but not limited to, the store from which the data is collected, the time period over which the data is collected, a UPC (Universal Product Code) for the product, and provide a UPC description of the product. Also, the raw econometric data must include product cost (e.g., the wholesale cost to the store), number of units sold, and either unit revenue or unit price. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013). The data is then subjected to a first error detection and correction process (Step 1015). Typically, this step includes the removal of all duplicate records and the removal of all records having no match in the client supplied data (typically scanner data).

Data subsets concerning store hierarchy are defined (Step 1017). This means stores are identified and categorized into various useful subsets. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information, determined through standard deviation or cross store comparisons, are also removed.

This is followed by defining groups of products and their attributes (Step 1021). This may include the receipt of demand group information from the Auto Demand Group Generator 150. In addition, updated demand group and attribute information can then be input as received (Step 1023).

The data is further processed by defining an "equivalizing factor" for the products of each demand group in accordance with size and UOM parameters (Step 1025). This equivalizing factor can be provided by the client or imputed. An equivalizing factor can be imputed by using, for example, the median size for each UOM. Alternatively, some commonly used arbitrary value can be assigned. Once this information is gathered, all product prices and volume can be "equivalized". Chiefly, the purpose of determining an equivalizing factor is to facilitate comparisons between different size products in a demand group.

The data is then subjected to a third error detection and correction process, which detects the effects of closed stores and certain other erroneous records (Step 1027). In accord with the principles of the invention, stores that demonstrate no product movement (product sales equal to zero) over a predetermined time period are treated as closed. Those stores and their records are dropped from the process. The third error detection and correction also includes analysis tools for detecting the presence of erroneous duplicate records. A further correction can be made for records having the same date and causal value but have differing prices or differing number of units sold.

After all the duplicate records are eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times.

Next, the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. For the time periods having no records, a determination must be made. Is the record missing because:

a. there were no sales of that product during that week (time period);
  b. the product was sold out and no stock was present in the store during that time period (this situation is also referred to herein as a "stock-out");
  c. the absence of data is due to a processing error.

Figure 11:
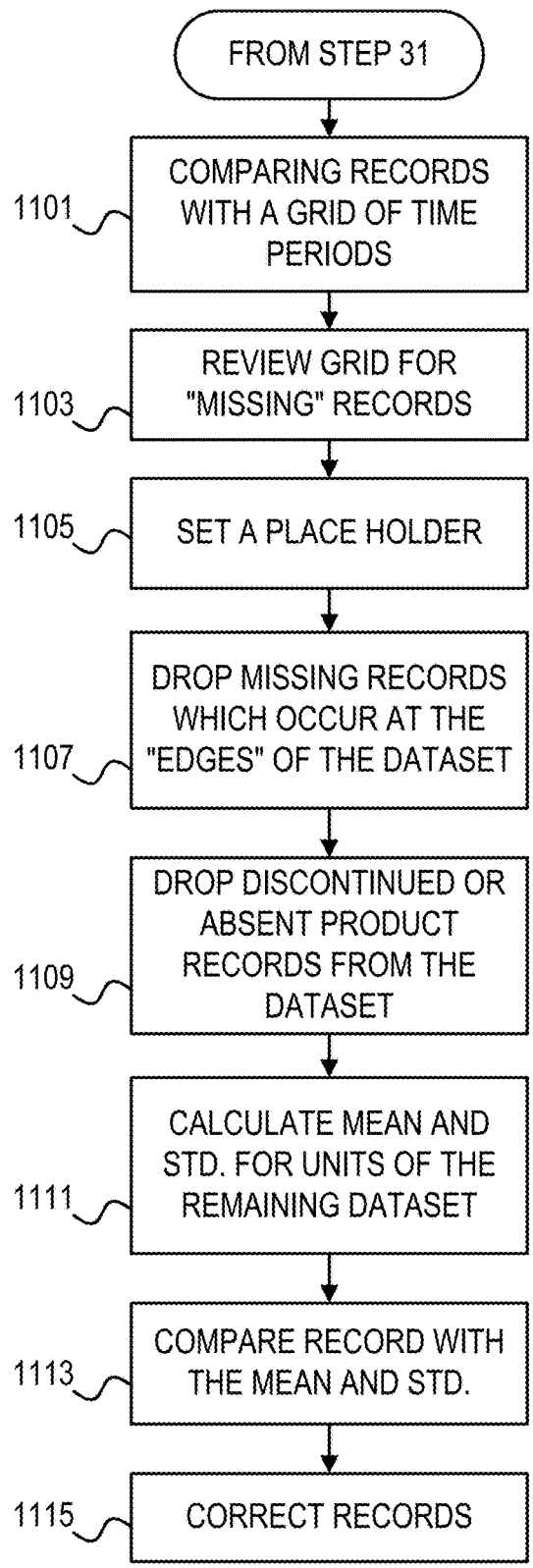
FIG. 11 is a flow chart depicting a process flow depicting a process by which partially cleansed econometric data is subject to further error detection and correction in accordance with some embodiment of the present invention.

FIG. 11 depicts an exemplary process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

The net result of execution of the process Steps 1011-1031 disclosed hereinabove is the generation of a cleansed initial dataset which can be used for its own purpose or input into other econometric processes. One such process is the generation of imputed econometric variables.

Note that other methods for addressing missing records may be utilized, as is well known by those skilled in the art. For example, missing records may be simply dropped. Alternatively, such records may be incorporated with additional information such as extrapolated values form before and/or after the data point, median values or other replacement value.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

A. Imputed Base Price

Figure 12:
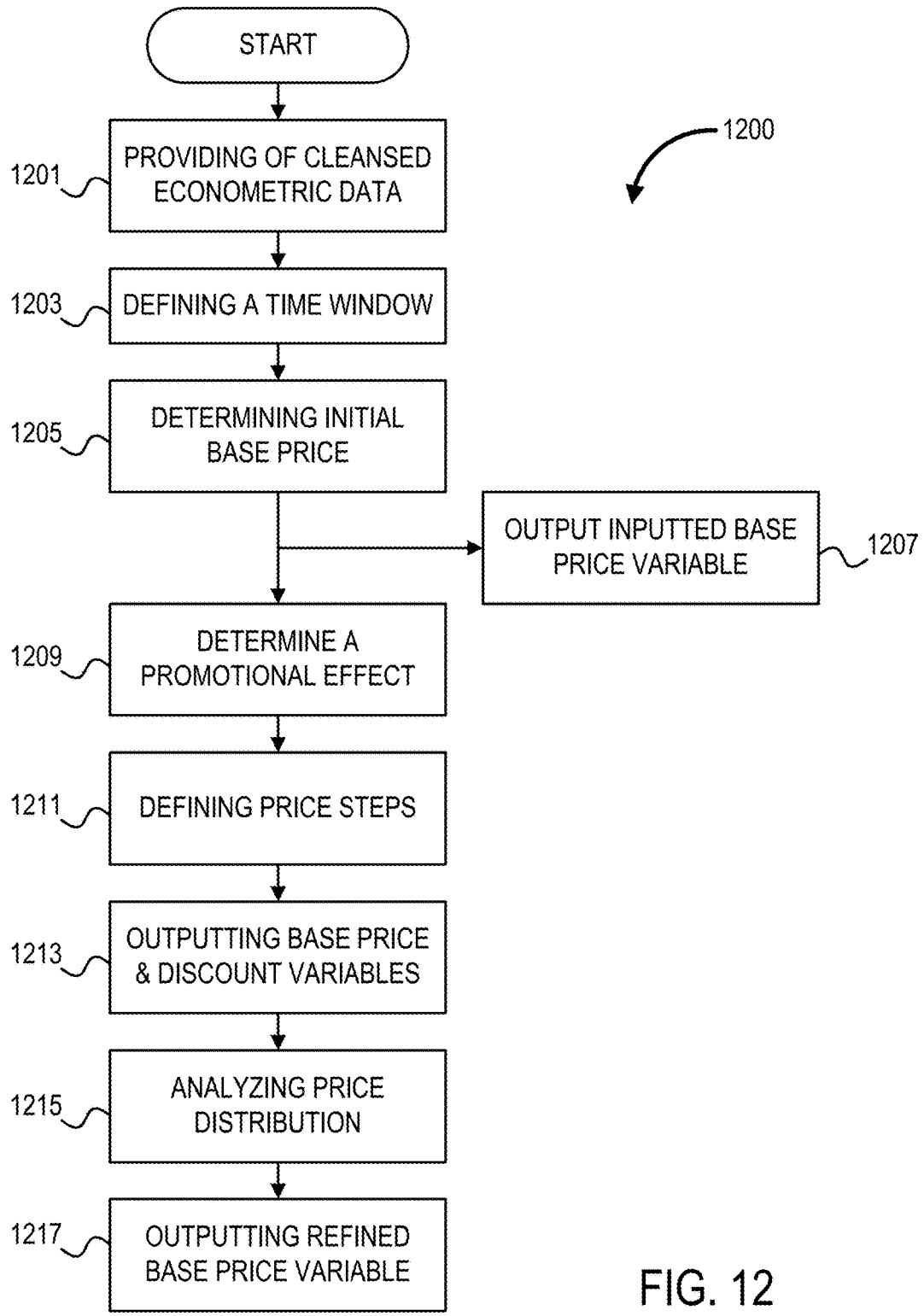
FIG. 12 is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 12 is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected.

The initial base price values generated above provide satisfactory values for the imputed base price variable which may be output (Step 1207) and used for most purposes. However, optional Steps 1209-1217 describe an approach for generating a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209).

Further analysis is used to define base price "steps" (Step 1211). Base price data points are evaluated. Steps are roughly defined such that the base price data points lie within a small percent of distance from the step to which they are associated (e.g., 2%). This can be accomplished using, for example, a simple regression analysis such as is known to those having ordinary skill in the art. By defining the steps, the average value for base price over the step is determined. Also, price data points are averaged to determine the base price of step. Thus, the average of the base prices in a step is treated as the refined base price for that step.

Further refining includes an analysis of the first step. If the first step is short (along the time axis) and considerably lower than the next step, it is assumed that the first step is based on a discounted price point. As such, the value of the next step is treated as the base price for the time period of the first step.

At this point, absolute discount ($\Delta P$) and base price (BP) are used to calculate percent discount ($\Delta P/BP$) for each store product time period.

This base price is subjected to further analysis for accuracy using cross-store checking (Step 1215). This can be accomplished by analyzing the base price data for each product within a given store, and comparing with all other stores. Any outlier store's base price is adjusted for the analyzed product such that it lies closer to an average cross-store percentile for base price over all stores.

Thus, the forgoing process illustrates an embodiment for determining an imputed base price variable.

B. Imputed Relative Price Variable

Figure 13:
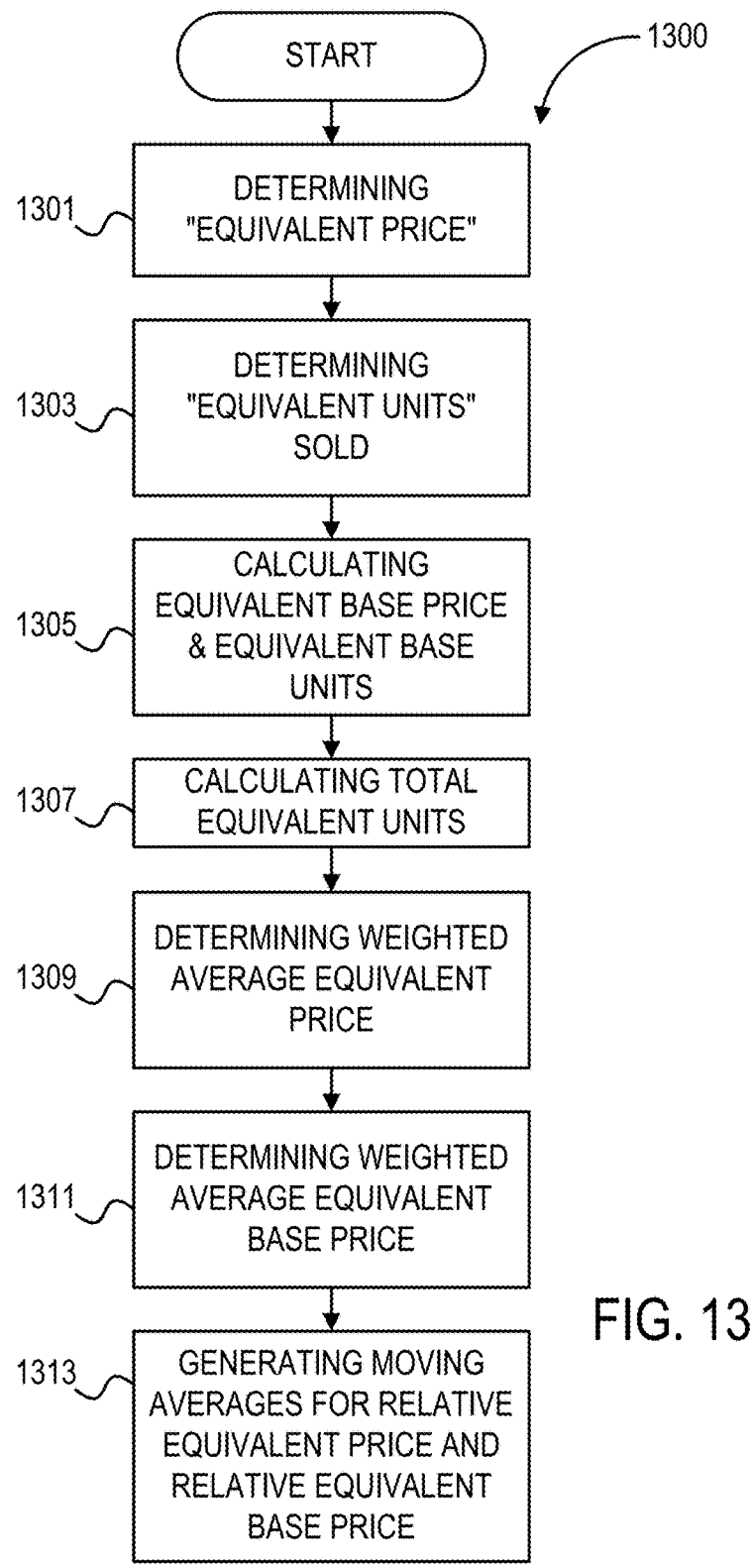
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. A relative price may be calculated. As disclosed earlier, an equivalizing factor is defined. Using the equivalizing factor, an equivalent price can be calculated (Step 1301). Next equivalent units sold ("units") can be calculated (Step 1303). In a similar vein, equivalent base price and equivalent base units are calculated (Step 1305) using the imputed values for base price (for example, as determined in Steps 1201-1207) and for base units (also referred to as base volume which is determined as disclosed below). For each Store, each demand group, and each date, the total equivalent units is determined (Step 1307). A weighted calculation of relative equivalent price is then made (Step 1309).

For example, such relative price value is determined as follows: equivalent price is divided by a weighted denominator, the weighted denominator is calculated by multiplying equivalent units for each product times the equivalent units sold. For each product, only the values of other products are used in the calculation. This means excluding the product being analyzed. For example, the relative price of A, given three exemplary products A, B and C, is determined as follows:

$$rel_A = \frac{equiv.priceofA}{\left[\begin{array}{c}(equiv.unitsofB)(Equiv.priceofB) + \\ (equiv.unitsofC)(equiv.priceofC) \\ \hline totalequivalentunits - equivalentunitsofA\end{array}\right]}$$

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313). Thus a variety of imputed relative price variables can be generated (e.g., relative equivalent price, relative equivalent base price, etc.).

C. Imputed Base Volume Variable

Figure 14A:
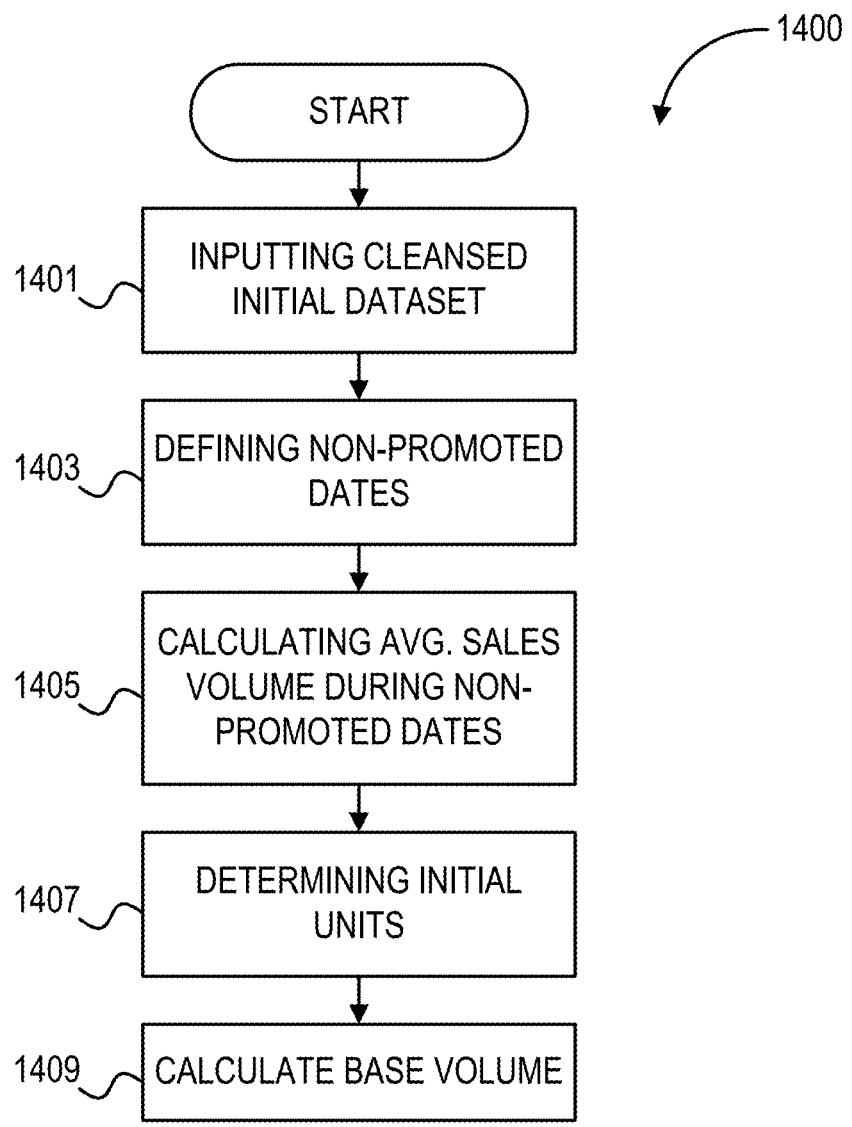
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403), i.e., dates where the products are not significantly price discounted. Using the non-promoted data subset, an average value for "units" and a STD is calculated (i.e., an average value for product unit sales volume for each product during the non-promoted dates is calculated) (Step 1405). This value shall be referred to as the "non-promoted average units". An initial value for base units ("initial base units") is now determined (Step 1407).

Figure 14B:
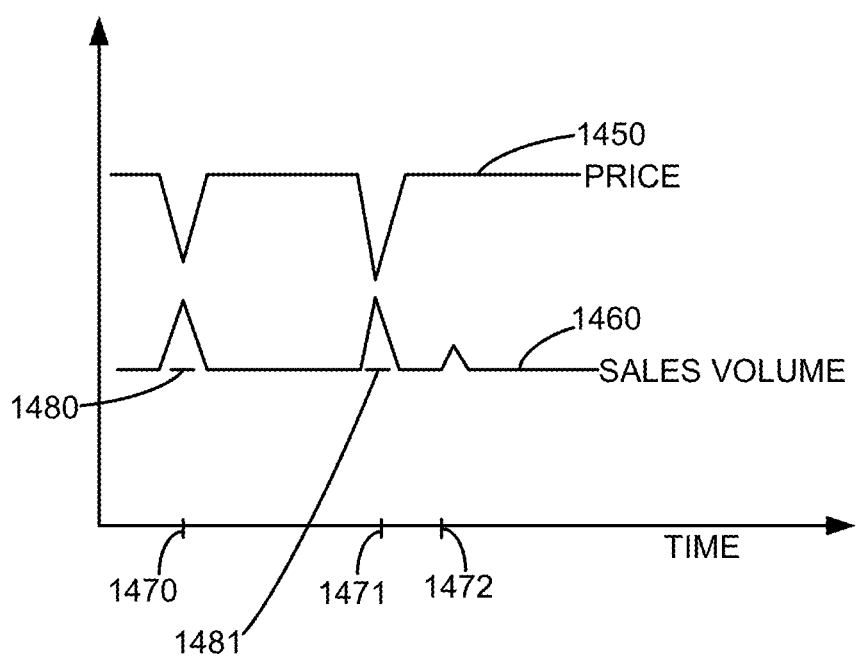
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

D. Supplementary Error Detection and Correction

Figure 15A:
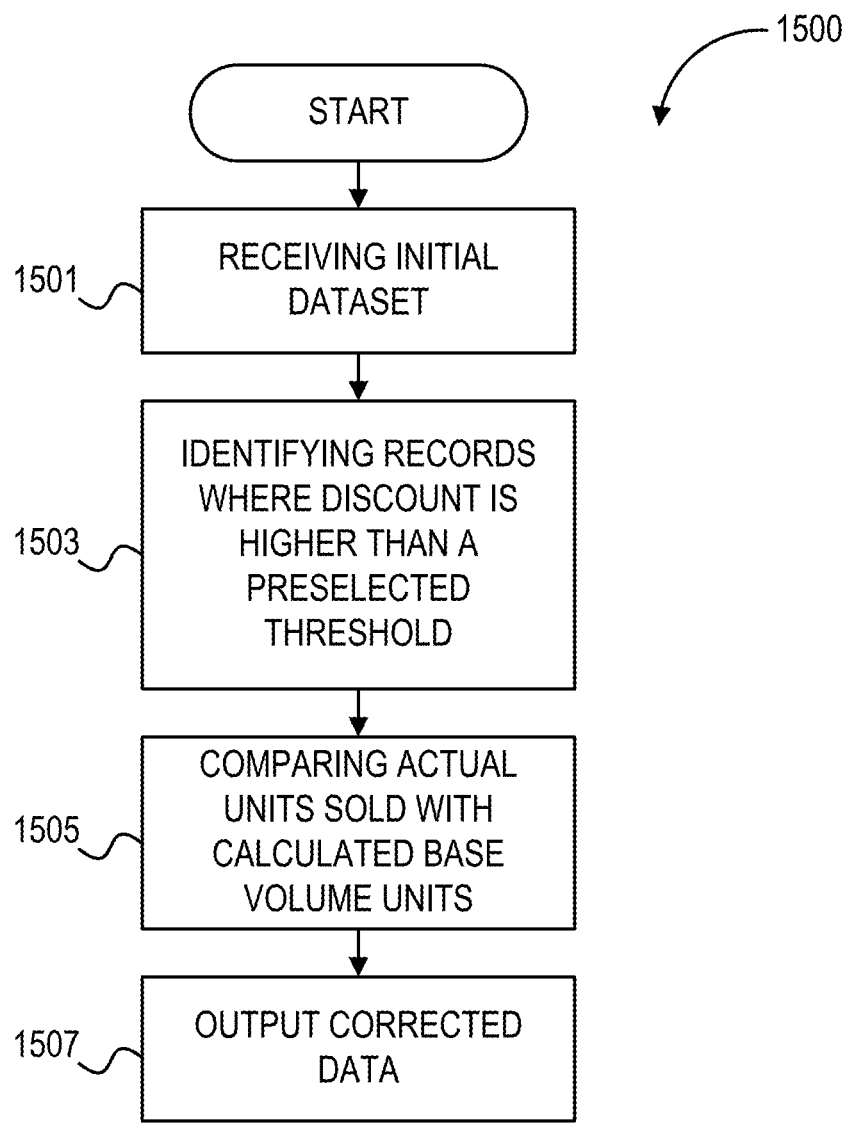
FIG. 15A is a flow chart depicting a process flow by which supplementary error detection and correction in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleansed initial dataset information for each product and store (Step 1501). In addition, the previously calculated discount information is also input, or alternatively, the discount information (e.g., ΔP/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505). Corrected data is output (step 1507).

Figure 15B:
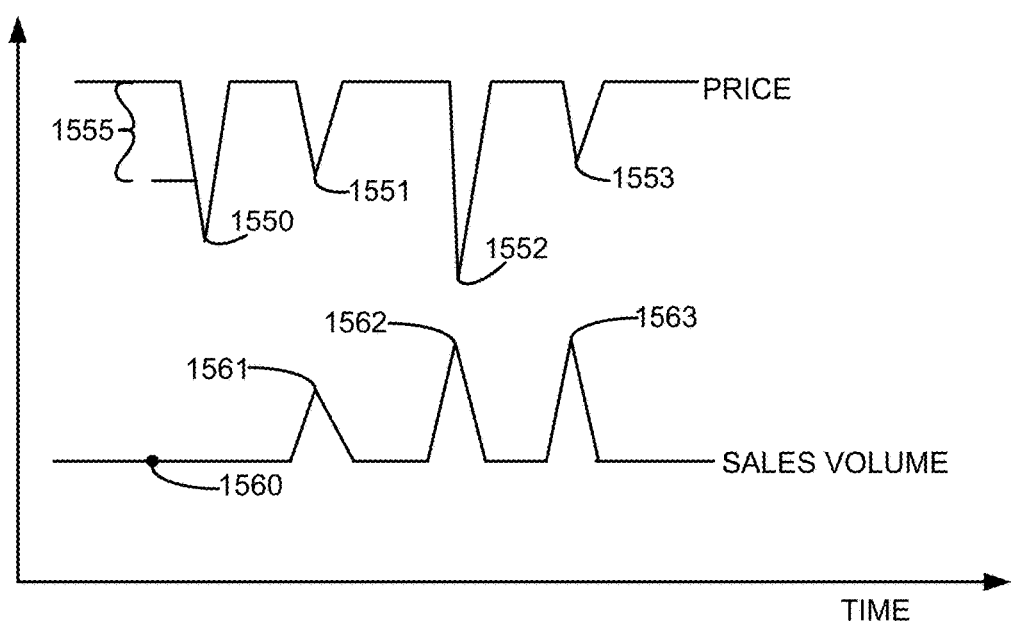
FIG. 15B is a diagram used to illustrate the comparative effects of sales volume increase and price discounts.
Figure 16:
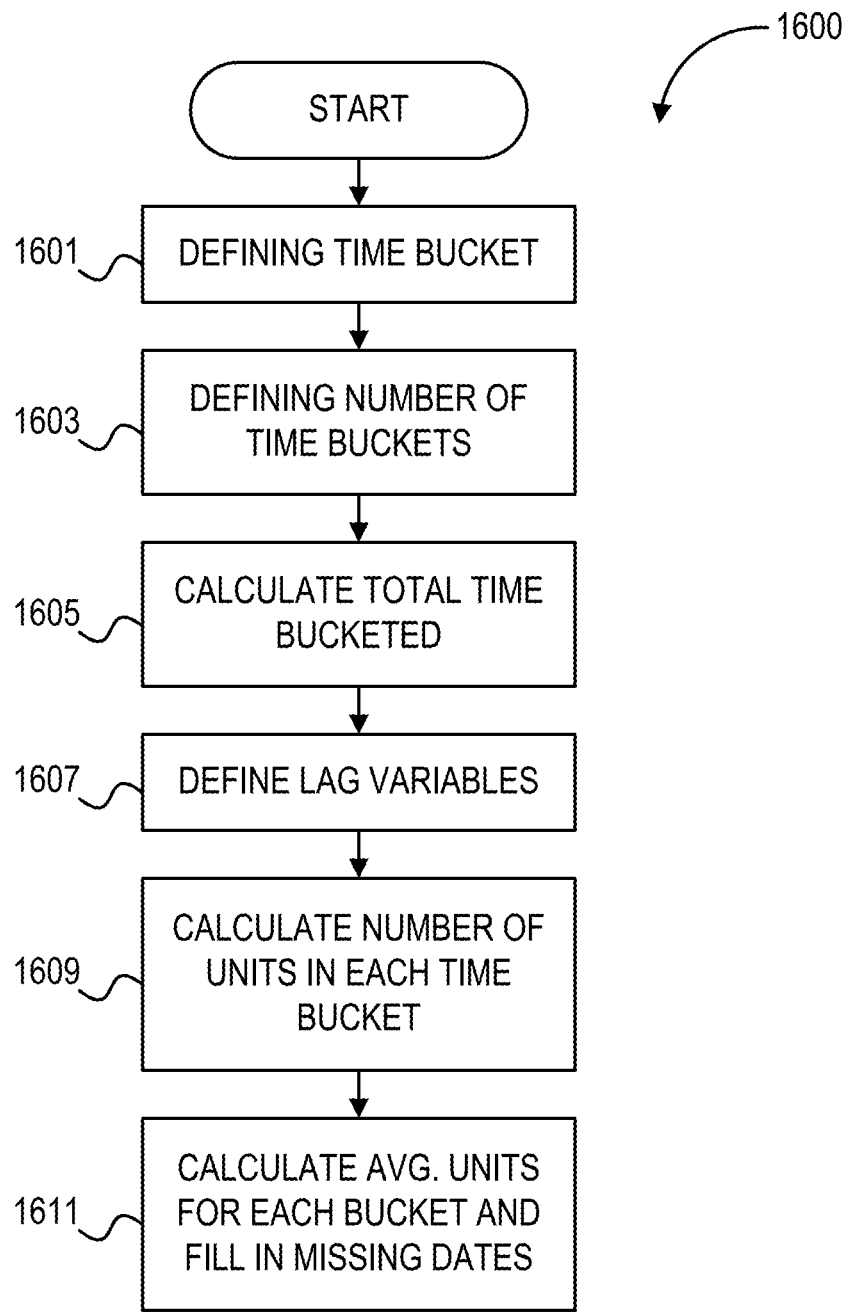
FIG. 16 is a flow chart depicting a process flow by which an imputed stockpiling variable can be generated in accordance with an embodiment of the present invention.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by at data points 1561, 1562, and 1563. The data point 1550 has a discount greater than the threshold 1555 (e.g., 60%). So an analysis is made of data point 1550.

E. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket" (m), for example, the size (m) of the bucket can be measured in days (Step 1601). Additionally, the number (τ) of time buckets to be used is also defined (Step 1603). The total amount of time "bucketed" (m×τ) is calculated (Step 1605).

"Lag" variables which define the number of product units sold ("units") in the time leading up to the analyzed date are defined (Step 1607). Then the total number of product units sold is calculated for each defined time bucket (Step 1609). Correction can be made at the "front end" of the modeled time interval.

If working near the front end of a dataset, units from previous weeks cannot always be defined and in their place an averaged value for bucket sum can be used (Step 1611). The idea is to detect and integrate the effects of consumer stockpiling on into a predictive sales model.

F. Day of the Week Analysis

Figure 17:
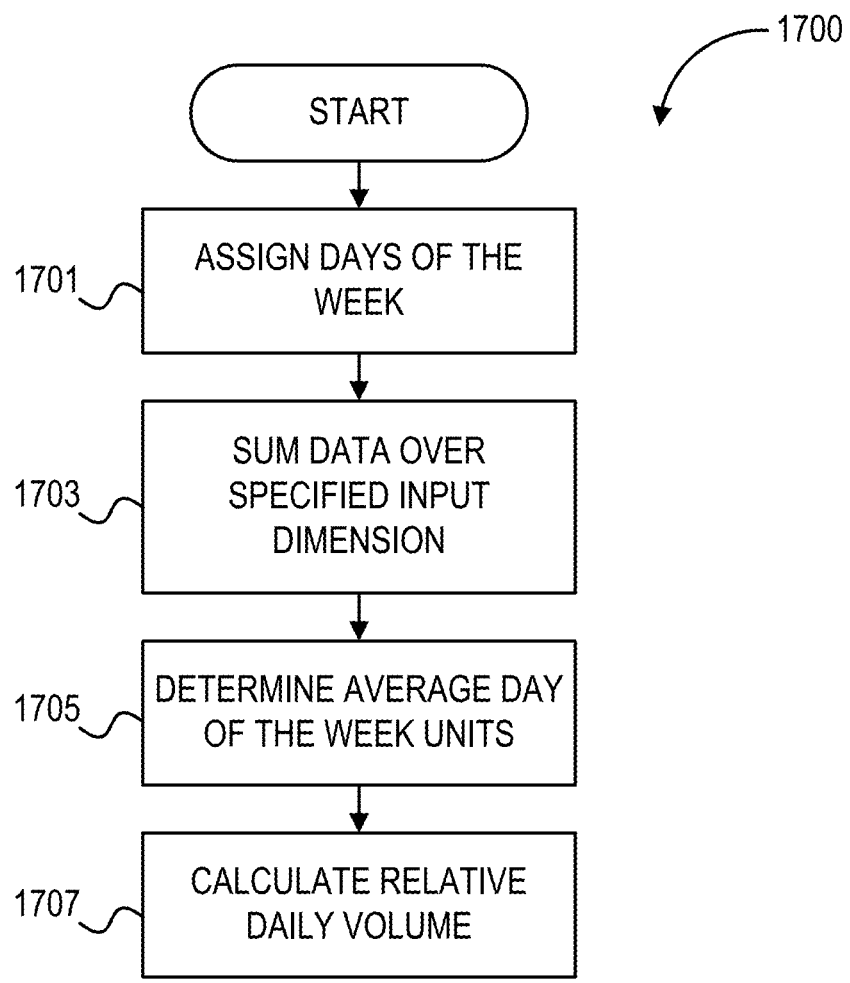
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention, the embodiment begins by assigning the days of the week numerical values (Step 1701). Once categorized by day of the week, the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For each Day of Week and each dimension specified, the average units (sold) are determined (Step 1705). For each date, a "relative daily volume" variable is also determined (Step 1707). This information may prove valuable to a client merchant and can comprise an input variable for other econometric models.

G. Imputed Seasonality Variable Generation

Figure 18:
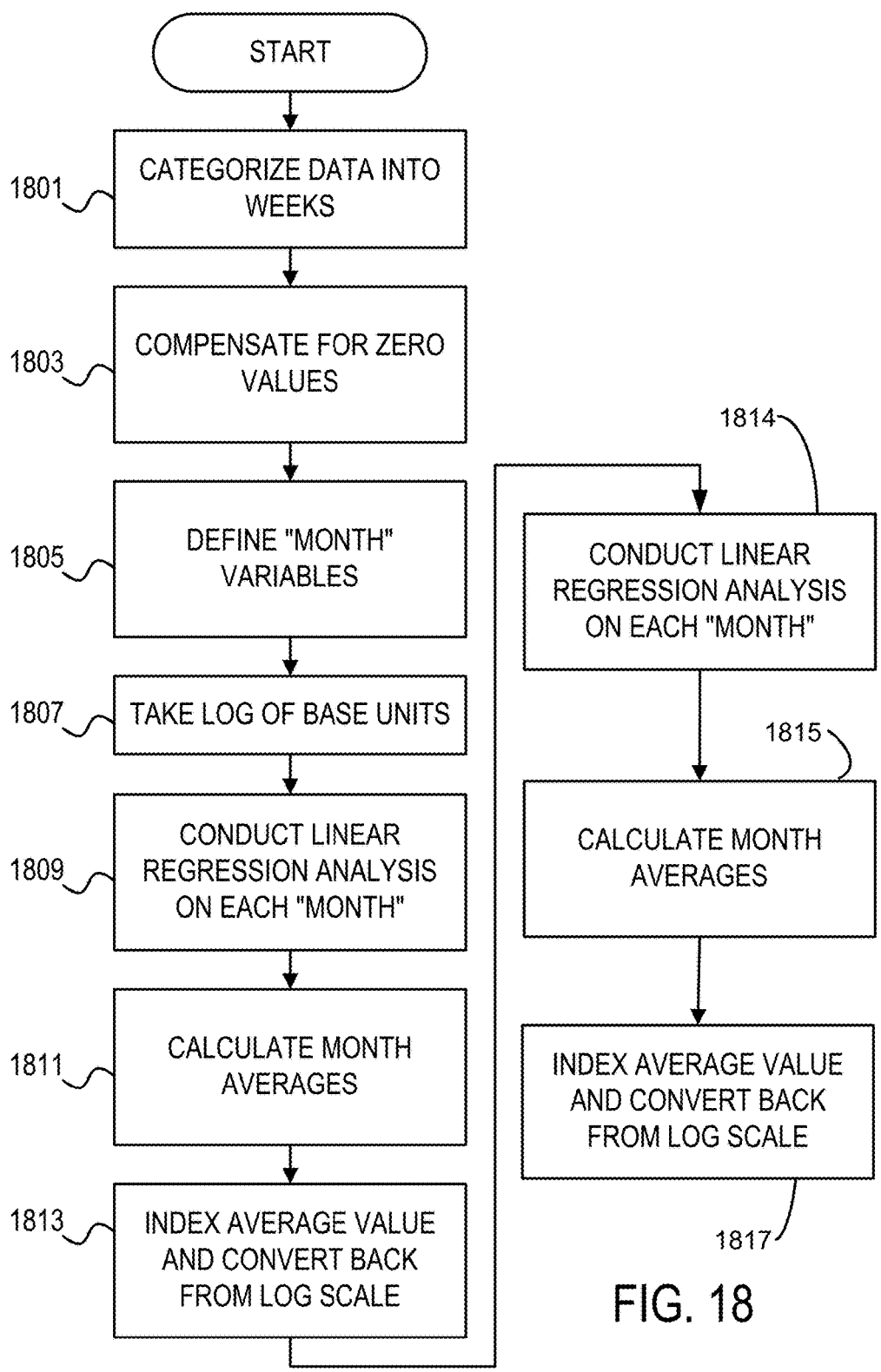
FIG. 18 is a flow chart depicting a process flow by which an imputed seasonality variable can be generated in accordance with an embodiment of the present invention.

Another useful imputed variable is an imputed seasonality variable for determining seasonal variations in sales volume. Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

H. Imputed Promotional Variable

Figure 19:
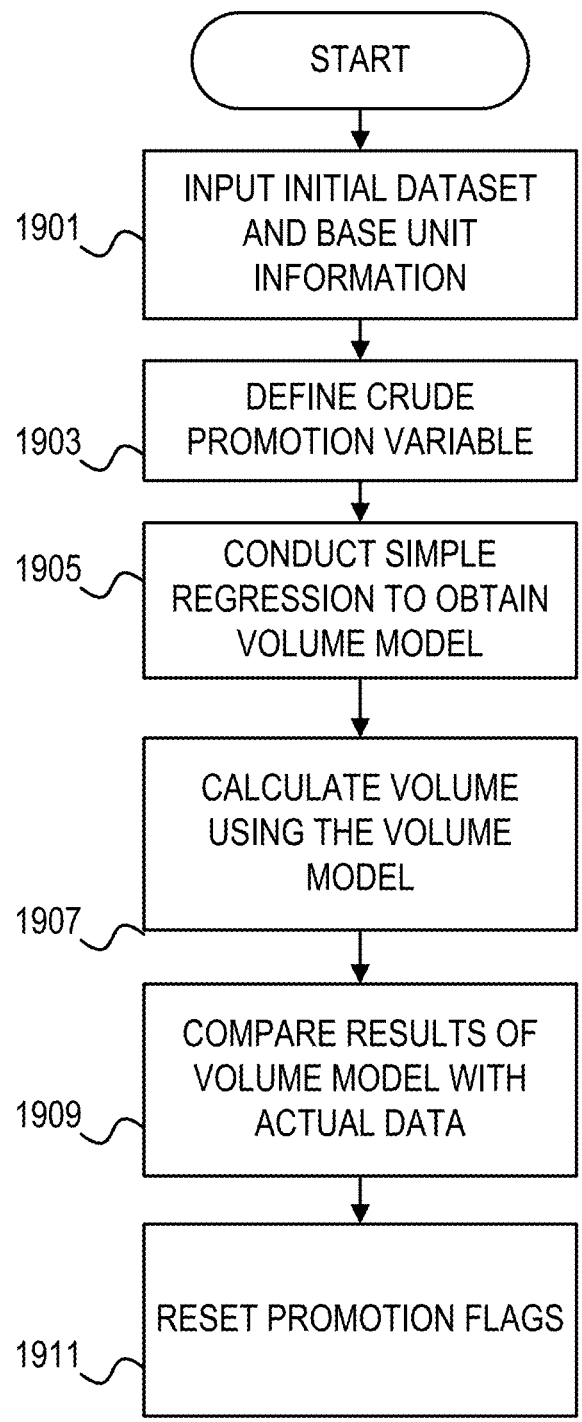
FIG. 19 is a flow chart depicting a process flow by which an imputed promotional effects variable can be generated in accordance with an embodiment of the present invention.

Another useful variable is a variable which can predict promotional effects. FIG. 19 provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Referring back to FIG. 19, the process begins by inputting the cleansed initial dataset and the calculated average base units information (Step 1901). A crude promotional variable is then determined (Step 1903). Such a crude promotional variable can be defined using promotion flags. A simple regression analysis, as is known to those having ordinary skill in the art, (e.g., a mixed effects regression) is run on sales volume to obtain a model for predicting sales volume (Step 1905). Using the model, a sample calculation of sales volume is performed (Step 1907). The results of the model are compared with the actual sales data to further refine the promotion flags (Step 1909). If the sales volume is underpredicted (by the model) by greater than some selected percentage (e.g., 30-50%), the promotion flag may be set to reflect the effects of a probable non-discount promotional effect. Since the remaining modeled results more closely approximate actual sales behavior, the promotion flags for those results are not reset (Step 1911). The newly defined promotion flags are incorporated into a new model for defining the imputed promotional variable.

I. Imputed Cross-Elasticity Variable

Figure 20:
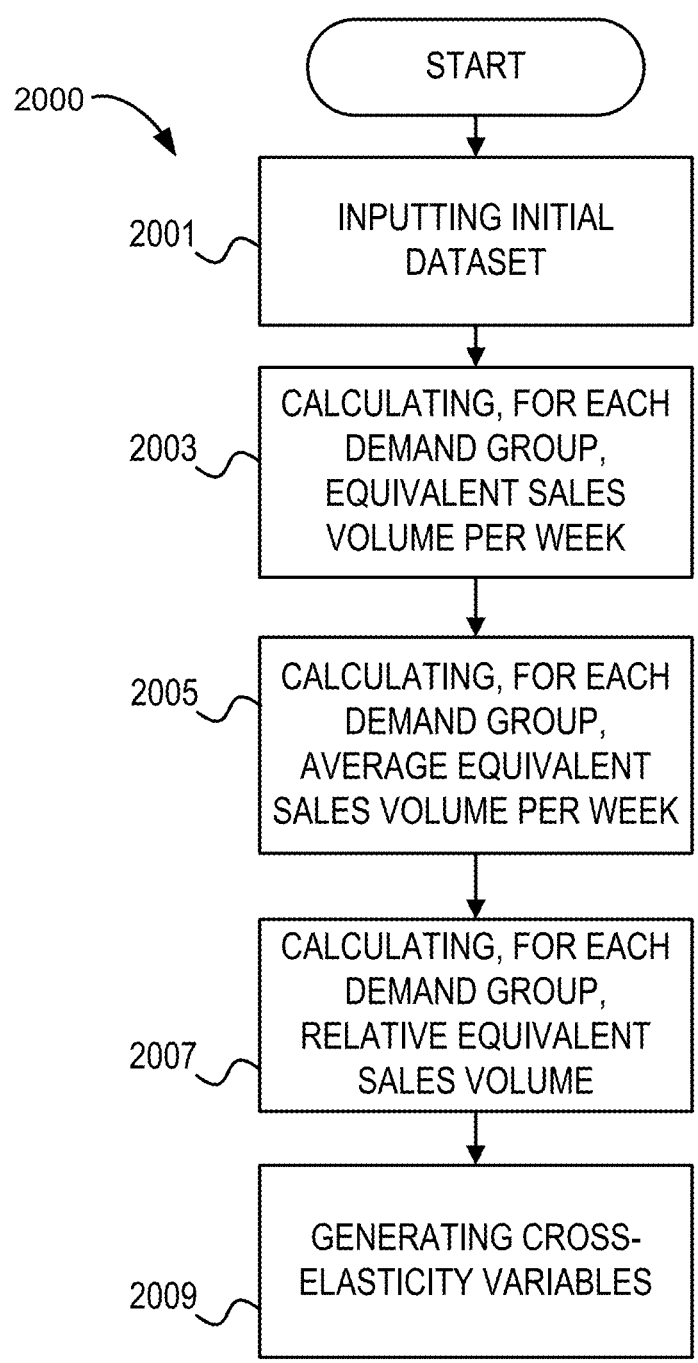
FIG. 20 is a flow chart depicting a process flow by which an imputed cross-elasticity variable can be generated in accordance with some embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories at a grocery retailer are, among many others, Italian foods, breakfast foods, or soft drinks.

The initial dataset information is input into the system (Step 2001). For each demand group the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). The relative demand group equivalent sales volume for the other demand groups is quantified and treated as a variable in the calculation of sales volume of the first demand group, thereby generating cross-elasticity variables (Step 2009).

The calculated imputed variables and data are outputted from the Imputed Variable Generator 304 to the Coefficient Estimator 308. Some of the imputed variables may also be provided to the Financial Model Engine 108.

B. Coefficient Estimator

The Coefficient Estimator 308 uses the imputed variables and data to estimate coefficients, which may be used in an equation to predict demand. In a preferred embodiment of the invention, sales for a demand group (S) is calculated and a market share (F) for a particular product is calculated, so that demand (D) for a particular product is estimated by $D = S \cdot F$. A demand group is defined as a collection of highly substitutable products. In the preferred embodiments, the imputed variables and equations for sales (S) of a demand group and market share (F) are as follows:

1. Modeling Framework

The econometric modeling engine uses one or more of statistical techniques, including, but not limited to, linear and non-linear regressions, hierarchical regressions, mixed-effect models, Bayesian techniques incorporating priors, and machine learning techniques. Mixed-effect models are more robust with regards to missing or insufficient data. Further, mixed-effect models allows for a framework of sharing information across various subjects in the model, enabling better estimates. Bayesian techniques with prior information can incorporate all the features of the mixed effect models and, in addition, also enable for guiding the allowable values of the coefficients based upon existing information.

IV. Financial Model Engine

The Financial Model Engine 108 receives data 132 from the Stores 124 and may receive imputed variables (such as baseline sales and baseline prices) and data from the Econometric Engine 104 to calculate fixed and variable costs for the sale of each item.

Figure 5:
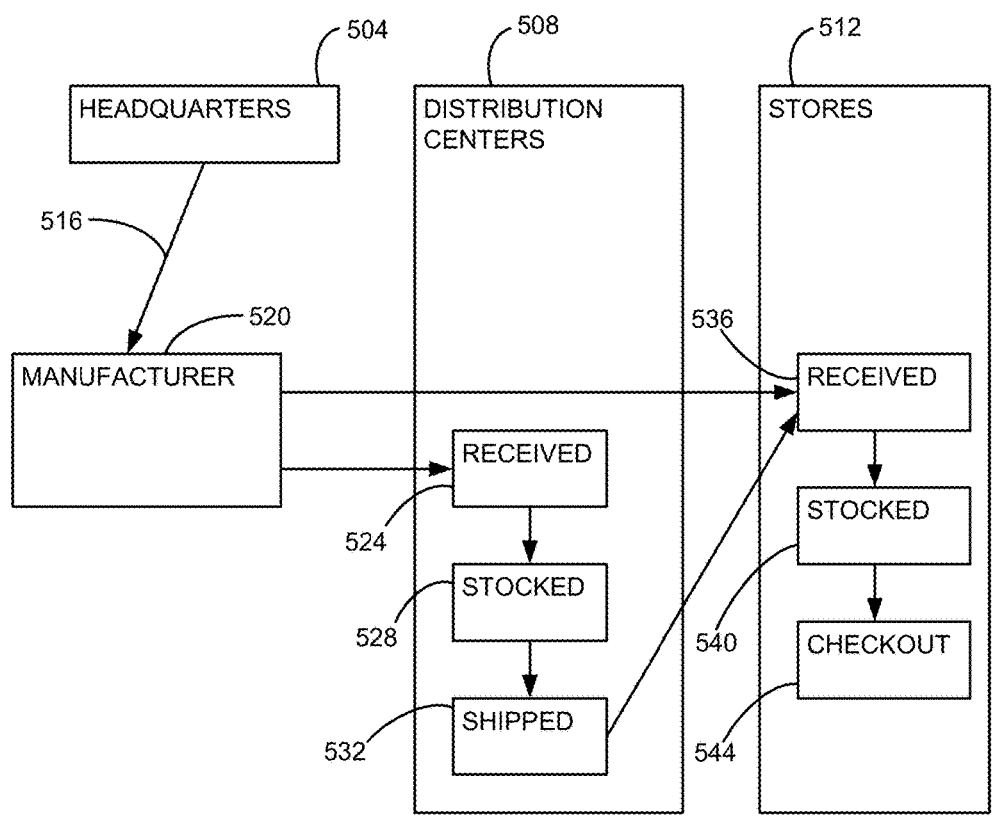
FIG. 5 is a block diagram to illustrate some of the transaction costs that occur in retail businesses of a chain of stores.
Figure 6:
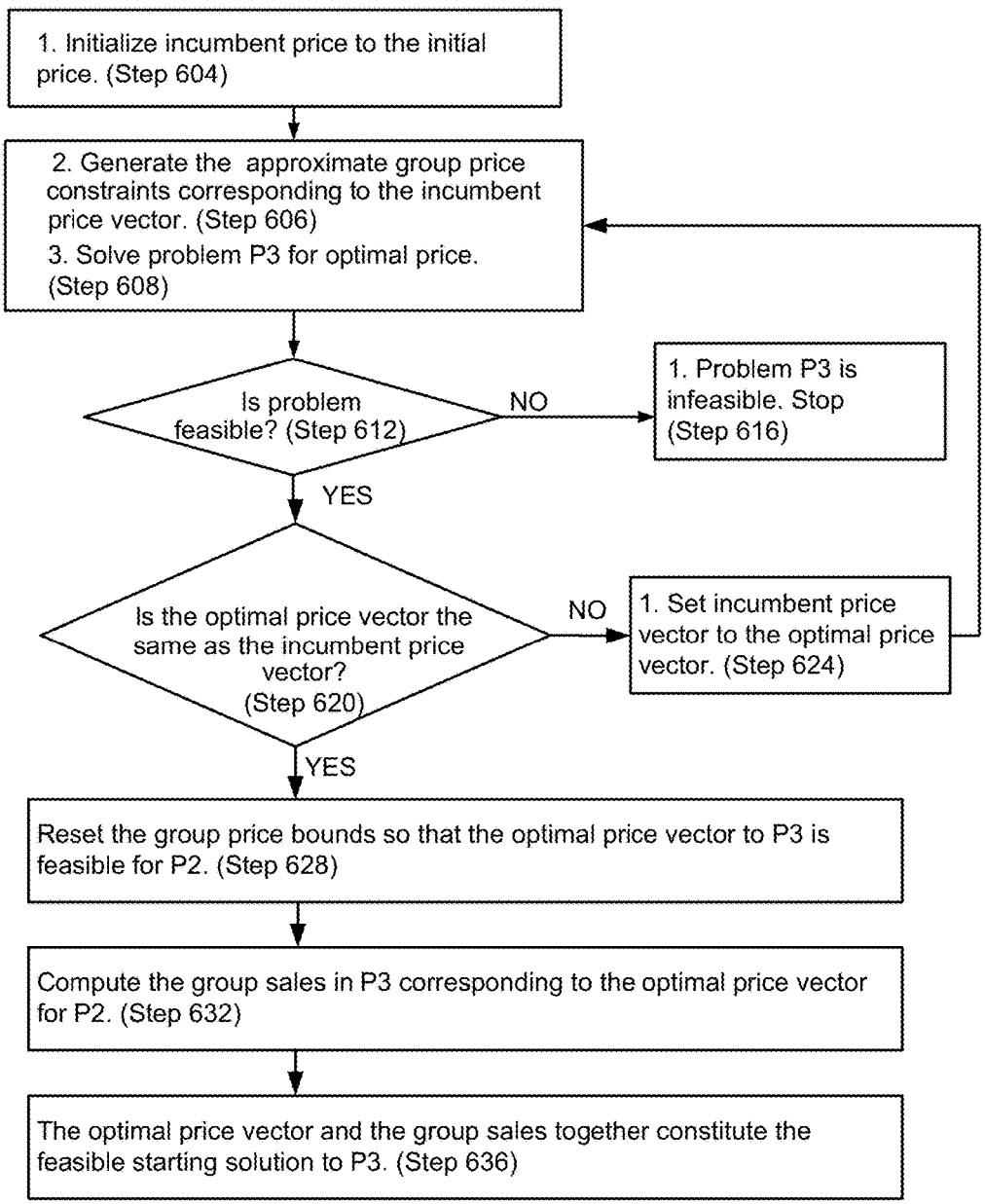
FIG. 6 is a flow chart of some embodiment of the invention for providing an initial feasible solution.

To facilitate understanding, FIG. 5 is an exemplary block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544.

The Financial Model Engine 108 should be flexible enough to provide a cost model for these different procedures. These different costs may have variable cost components where the cost of an item is a function of the amount of sales of the item and fixed cost components where the cost of an item is not a function of the amount of sales of the item. Financial Model Engine 108, thus, may generate a model that accounts for procurement costs in addition to the various costs associated with conducting business.

V. Optimization Engine and Support Tool

Figure 4:
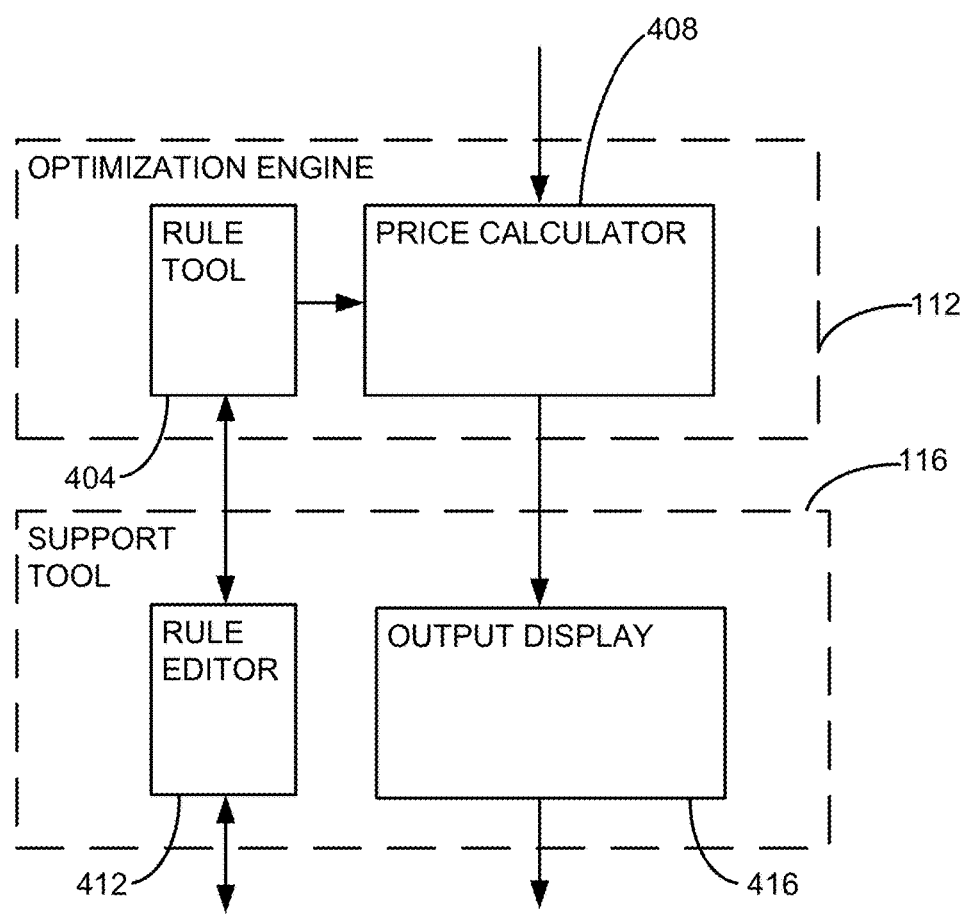
FIG. 4 is a more detailed schematic view of the optimization engine and support tool.

FIG. 4 is a more detailed schematic view of the Optimization Engine 112 and the Support Tool 116. The Optimization Engine 112 comprises a rule tool 404 and a price calculator 408. The Support Tool 116 comprises a rule editor 412 and an output display 416.

In operation, the client (stores 124) may access the rule editor 412 of the Support Tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. The client defined parameters for these rules are provided to the rule tool 404 of the Optimization Engine 112 from the rule editor 412 of the Support Tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the Support Tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the Support Tool 116, which allows the Stores 124 to receive the optimized pricing (step 232).

VI. System Platform

Figure 7A:
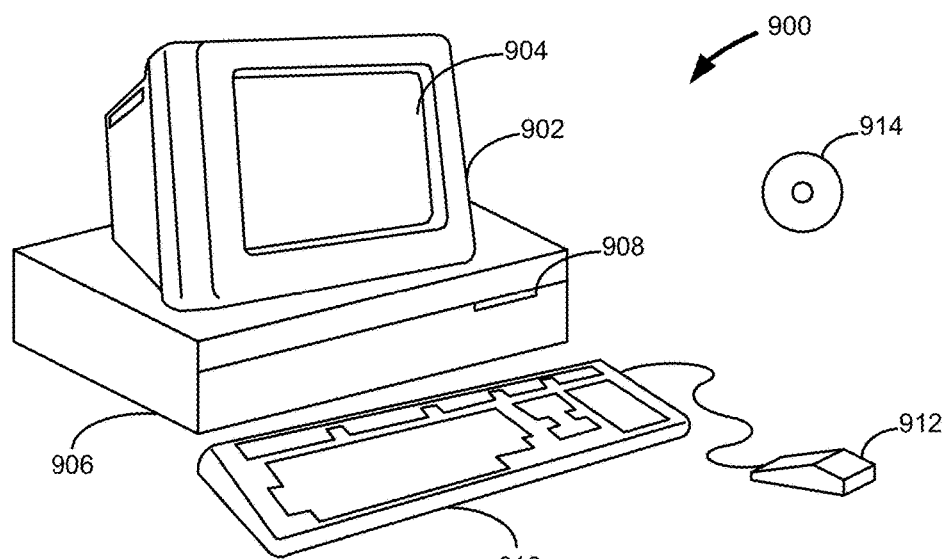
FIGS. 7A and 7B illustrate a computer system, which forms part of a network and is suitable for implementing embodiments of the present invention.
Figure 7B:
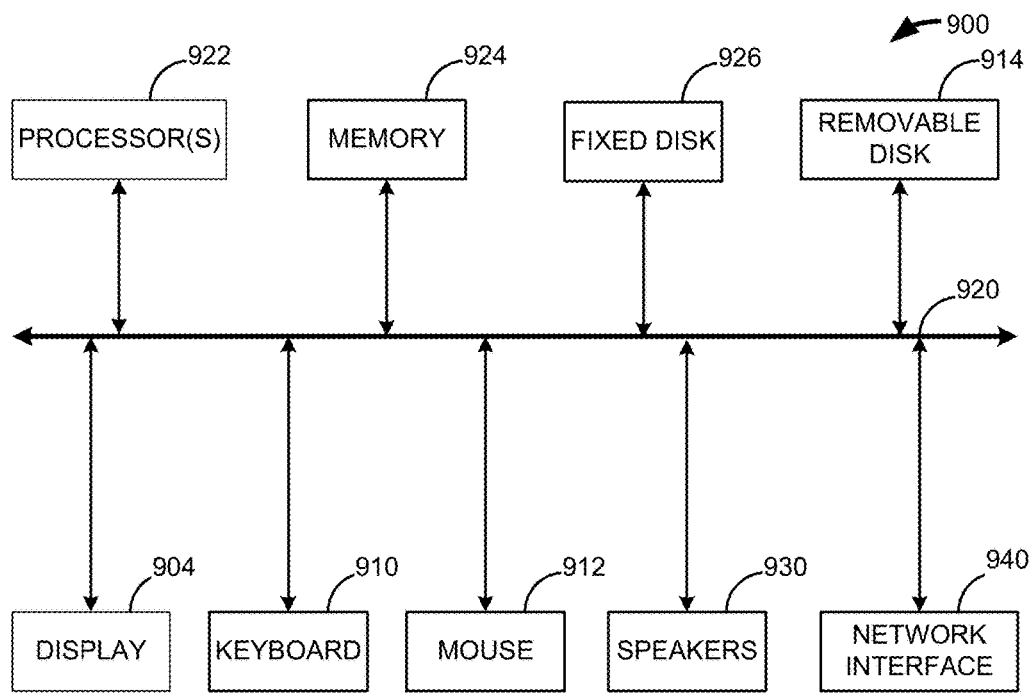

FIGS. 7A and 7B illustrate a computer system 900, which forms part of a network and is suitable for implementing embodiments of the present invention. FIG. 7A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 8:
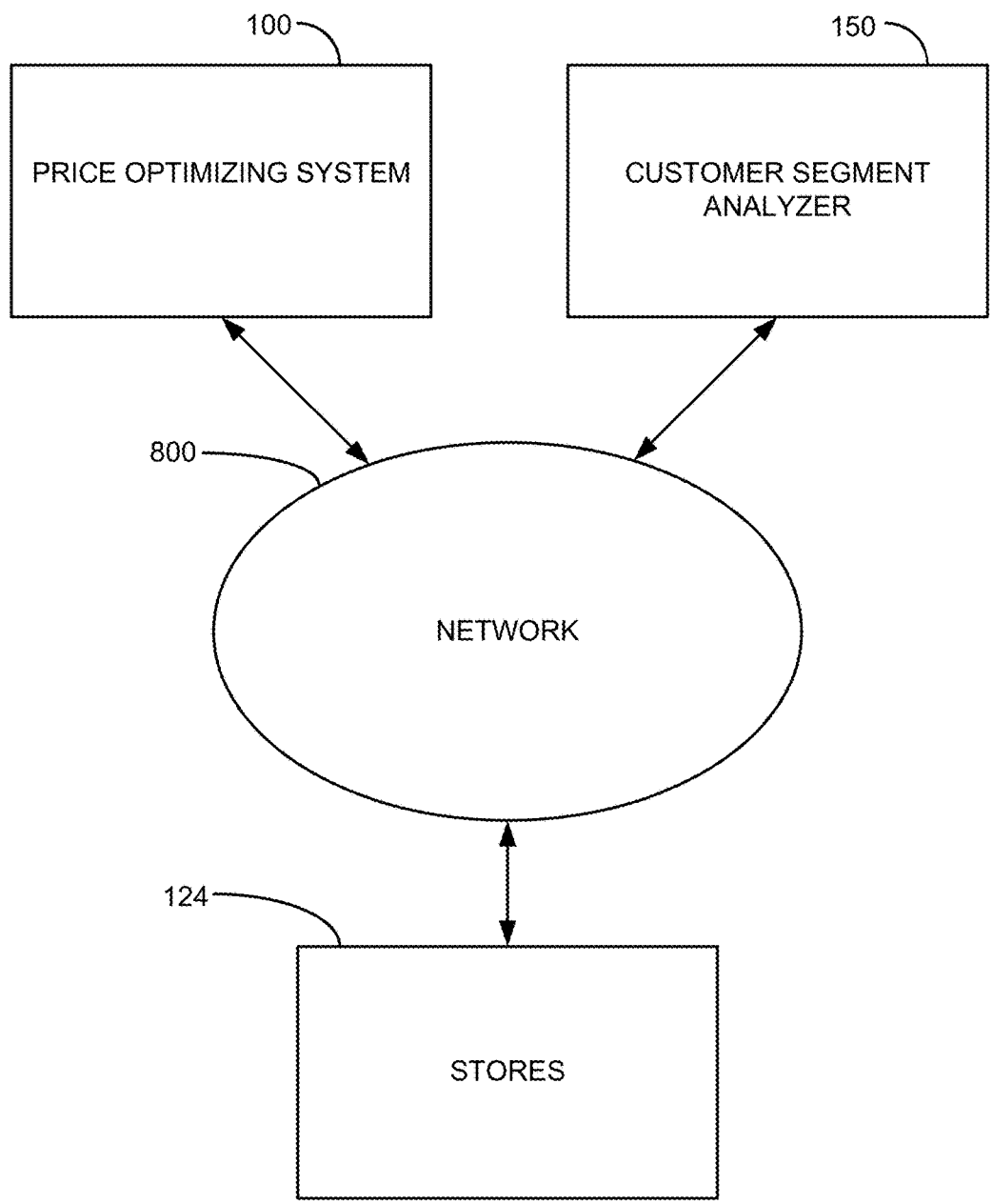
FIG. 8 is a schematic illustration of an embodiment of the invention that functions over a network.
Figure 9A:
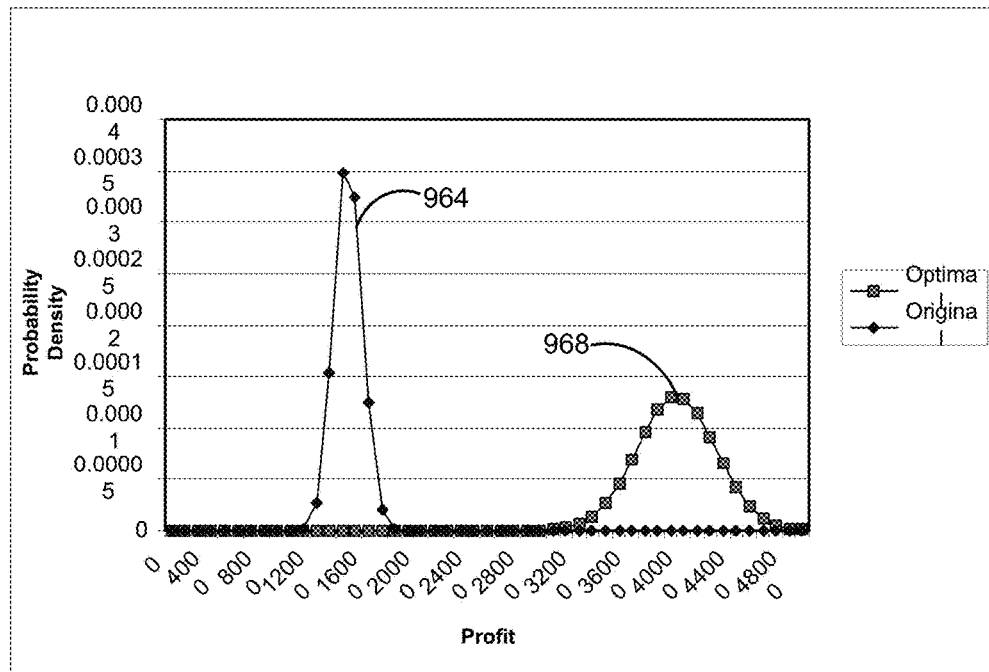
FIG. 9A is a graph of original profit from actual sales of the store using actual prices and optimal profit from optimized sales resulting from the calculated optimized prices bounded by its probability.
Figure 9B:
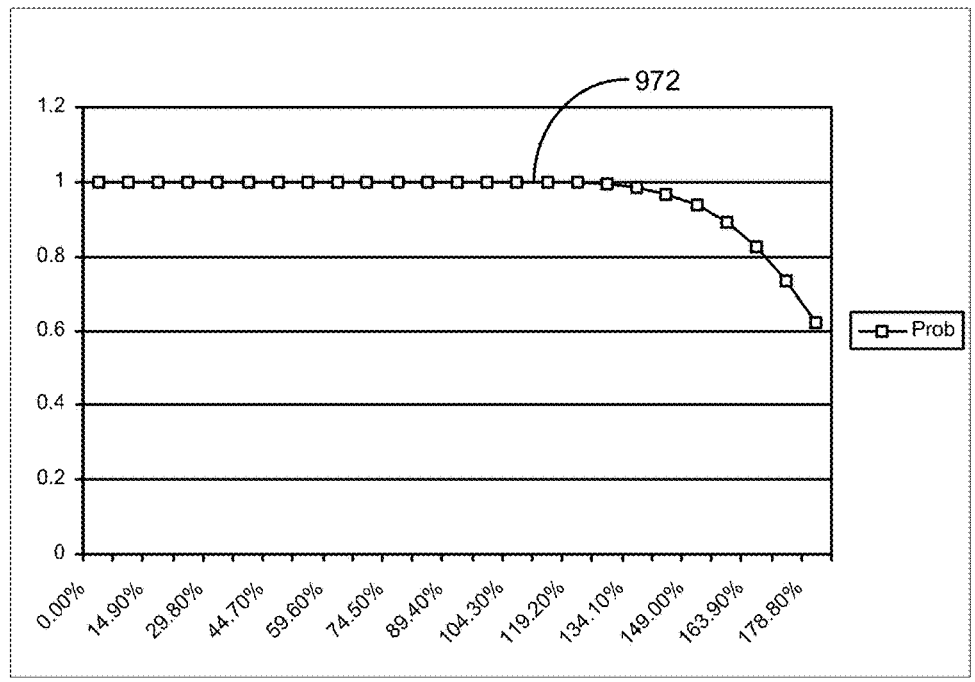
FIG. 9B is a graph of percentage increase in profit and the probability of obtaining at least that percentage increase in profit.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment, the Price Optimizing System for Business Planning 100 is connected to the network 800. The Stores 124 are also connected to the network 800. The Stores 124 are able to bi-directionally communicate with the Price Optimizing System for Business Planning 100 over the network 800. Additionally, in embodiments where the Auto Demand Group Generator 150 is not integrated within the pricing optimization system, the Stores 124 are likewise able to bi-directionally communicate with the Auto Demand Group Generator 150 over the network 800.

Additionally, in some embodiments, the system may be hosted on a web platform. A browser or similar web component may be used to access the Likelihood of loss engine. By utilizing internet based services, retailers may be able to access the system from any location.

In the specification, examples of product are not intended to limit products covered by the claims. Products may for example include food, hardware, software, real estate, financial devices, intellectual property, raw material, and services. The products may be sold wholesale or retail, in a brick and mortar store or over the internet, or through other sales methods.

In sum, the present invention provides a system and methods for generating demand groups in an automated or semi-automated fashion. The advantages of such a system include the ability to generate accurate demand groups given a set of products in an efficient and effective manner.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for generation of demand groups comprising:
   receiving a product listing via a processor, wherein the product listing includes products comprising existing products of a product line and at least one new product with insufficient information for demand modeling that is being considered for inclusion in the product line;
   receiving product data for each of the products in the product listing and demand coefficients for existing products in the product listing via the processor;
   scanning the existing products via scanners at a network node to generate point of sales data and receiving the point of sales data for the existing products in the product listing over a network via the processor;
   assigning attributes to each of the products of the product listing based upon the product data via the processor, wherein the product data includes product descriptors, and assigning the attributes to the products includes natural language processing of the product descriptors via the processor, wherein the product descriptors are provided in a natural language and the natural language processing enables the processor to generate machine readable attribute data and indicate meanings by annotating terms of the product descriptors with information indicating corresponding characteristics to assign the attributes;
   analyzing, via the processor, the point of sales data and generating a transition matrix including one or more pairs of existing products and, for each pair of products, a sum of a quantity of occurrences of transitions within a series of purchases to identify substitutable products, wherein a transition is represented by a switch from a first product of that pair in a first purchase to a second product of that pair in a second immediately succeeding purchase;
   clustering data of the existing products and at the least one new product of the product listing via the processor by:
   clustering data of the existing products based on the received point of sales data and demand coefficients, the transition matrix, and the assigned attributes including the machine readable attribute data and meanings via the processor; and
   clustering data of the at least one new product by:
   determining a distance between the clustered data of the existing products and the assigned attributes of the at least one new product including the machine readable attribute data and meanings from the natural language processing of the product descriptors; and
   clustering the data of the at least one new product with the clustered data of the existing products based on the determined distance;
   generating a decision tree modeling consumer decisions for existing products of the product listing utilizing the point of sales data via the processor;
   receiving, via the processor, at least one demand rule specifying one or more criteria for the demand groups;
   generating demand groups of the substitutable products, via the processor, by applying the received at least one demand rule to at least one of the decision tree and the clusters of data of the products of the product listing; and
   setting prices based on the generated demand groups.

2. The method for generating the demand groups, as recited in claim 1, further comprising receiving a confidence threshold for the generation of the demand groups.

3. The method for generating the demand groups, as recited in claim 2, further comprising generating a confidence level for each product, wherein the confidence level indicates accuracy of the placement of the product in the demand group.

4. The method for generating the demand groups, as recited in claim 3, further comprising comparing the confidence level of each product to the confidence threshold, and when the confidence level is below the confidence threshold flagging the product for user review.

5. The method for generating the demand groups, as recited in claim 1, wherein the clustering data of the existing products utilizes at least one of hierarchical clustering, k-means clustering, locality sensitive hashing, QT clustering, EM algorithms and model based clustering.

6. The method for generating the demand groups, as recited in claim 5, further comprising assigning weights to the assigned attributes, wherein the weights are used by the clustering of data of the products of the product listing.

7. The method for generating the demand groups, as recited in claim 6, further comprising updating the weights of the assigned attributes when new product data becomes available.

8. The method for generating the demand groups, as recited in claim 7, wherein the updated weights of the assigned attributes are set between old weights and weights of the new product data.

9. The method for generating the demand groups, as recited in claim 1, wherein the at least one demand rule includes at least one of a prioritization of size, type and brand for a division of products into the demand groups.

10. The method for generating the demand groups, as recited in claim 1, wherein generating demand groups using decision trees includes measuring distance of products to one another in the decision tree.

11. The method for generating the demand groups, as recited in claim 1, wherein utilizing the generated demand groups comprises:
reformatting demand group information by aggregating elements of the demand group information and processing the aggregated elements together as a single element to reduce a processing time of the processor.

12. A system for generation of demand groups comprising:
one or more network nodes including scanners to generate point of sales data;
at least one processor coupled to the one or more network nodes over a network and including:
an econometric coefficient analyzer configured to receive a product listing, demand coefficients, and point of sales data, wherein the product listing includes products comprising existing products of a product line and at least one new product with insufficient information for demand modeling that is being considered for inclusion in the product line, wherein the point of sales data and demand coefficients are received for the existing products and the point of sales data is received over a network from the one or more network nodes, and to analyze the point of sales data and generate a transition matrix including one or more pairs of existing products and, for each pair of products, a sum of a quantity of occurrences of transitions within a series of purchases to identify substitutable products, wherein a transition is represented by a switch from a first product of that pair in a first purchase to a second product of that pair in a second immediately succeeding purchase;
an attribute engine configured to receive product data for each of the products in the product listing, and further configured to assign attributes to each of the products of the product listing based upon the product data, wherein the product data includes product descriptors, and assigning the attributes to the products includes natural language processing of the product descriptors via the at least one processor, wherein the product descriptors are provided in a natural language and the natural language processing enables the at least one processor to generate machine readable attribute data and indicate meanings by annotating terms of the product descriptors with information indicating corresponding characteristics to assign the attributes;
a clustering engine configured to cluster data of the existing products and the at least one new product of the product listing by:
clustering data of the existing products based on the received point of sales data and demand coefficients, the transition matrix, and the assigned attributes including the machine readable attribute data and meanings; and
clustering data of the at least one new product by:
determining a distance between the clustered data of the existing products and the assigned attributes of the at least one new product including the machine readable attribute data and meanings from the natural language processing of the product descriptors; and
clustering the data of the at least one new product with the clustered data of the existing products based on the determined distance;
a decision tree generator configured to generate a decision tree modeling consumer decisions for the existing products utilizing the point of sales data;
a rule interface configured to receive at least one demand rule specifying one or more criteria for the demand groups;
a rule based engine configured to generate demand groups of the substitutable products by applying the received at least one demand rule to at least one of the decision tree and the clusters of data of the products of the product listing; and
a price optimization system for product price setting that utilizes the generated demand groups.

13. The system for generating the demand groups, as recited in claim 12, wherein the rule based engine is further configured to receive a confidence threshold for the generation of the demand groups.

14. The system for generating the demand groups, as recited in claim 13, wherein the rule based engine is further configured to generate a confidence level for each product, wherein the confidence level indicates accuracy of the placement of the product in the demand group.

15. The system for generating the demand groups, as recited in claim 14, wherein the rule based engine is further configured to compare the confidence level of each product to the confidence threshold, and when the confidence level is below the confidence threshold flagging the product for user review.

16. The system for generating the demand groups, as recited in claim 12, wherein the clustering engine utilizes for clustering the existing products at least one of hierarchical clustering, k-means clustering, locality sensitive hashing, QT clustering, EM algorithms and model based clustering.

17. The system for generating the demand groups, as recited in claim 16, further comprising a weighting engine configured to assign weights to the assigned attributes, wherein the weights are used by the clustering of data of the products of the product listing.

18. The system for generating the demand groups, as recited in claim 17, wherein the weighting engine updates the weights of the assigned attributes when new product data becomes available.

19. The system for generating the demand groups, as recited in claim 18, wherein the weighting engine sets the updated weights of the assigned attributes between old weights and weights of the new product data.

20. The system for generating the demand groups, as recited in claim 12, wherein the at least one demand rule includes at least one of a prioritization of size, type and brand for a division of products into the demand groups.

21. The system for generating the demand groups, as recited in claim 12, wherein the rule based engine generates demand groups using decision trees by measuring distance of products to one another in the decision tree.

22. The system for generating the demand groups, as recited in claim 12, wherein the at least one processor is configured to:
reformat demand group information by aggregating elements of demand group information and processing the aggregated elements together as a single element to reduce a processing time of the at least one processor.

23. A computer program product for generation of demand groups comprising:
a non-transitory computer readable storage medium having computer readable program code embodied thereon that when executed by a processor perform the following steps:

receive a product listing, wherein the product listing includes products comprising existing products of a product line and at least one new product with insufficient information for demand modeling that is being considered for inclusion in the product line;

receive product data for each of the products in the product listing and demand coefficients for existing products in the product listing;

receive over a network point of sales data for the existing products in the product listing generated by scanning the existing products via scanners at a network node;

assign attributes to each of the products of the product listing based upon the product data, wherein the product data includes product descriptors, and assigning the attributes to the products includes natural language processing of the product descriptors, wherein the product descriptors are provided in a natural language and the natural language processing enables generating machine readable attribute data and indicating meanings by annotating terms of the product descriptors with information indicating corresponding characteristics to assign the attributes;

analyze the point of sales data and generate a transition matrix including one or more pairs of existing products and, for each pair of products, a sum of a quantity of occurrences of transitions within a series of purchases to identify substitutable products, wherein a transition is represented by a switch from a first product of that pair in a first purchase to a second product of that pair in a second immediately succeeding purchase;

cluster data of the existing products and at the least one new product of the product listing by:

clustering data of the existing products based on the received point of sales data and demand coefficients, the transition matrix, and the assigned attributes including the machine readable attribute data and meanings; and clustering data of the at least one new product by:

determining a distance between the clustered data of the existing products and the assigned attributes of the at least one new product including the machine readable attribute data and meanings from the natural language processing of the product descriptors; and clustering the data of the at least one new product with the clustered data of the existing products based on the determined distance;

generate a decision tree modeling consumer decisions for existing products of the product listing utilizing the point of sales data;

receive at least one demand rule specifying one or more criteria for the demand groups;

generate demand groups of the substitutable products by applying the received at least one demand rule to at least one of the decision tree and the clusters of data of the products of the product listing; and set prices based on the generated demand groups.

24. The computer program product as recited in claim 23, wherein the computer readable program code executing on a processor performs the following steps:

receive a confidence threshold for the generation of the demand groups;

generate a confidence level for each product, wherein the confidence level indicates accuracy of the placement of the product in the demand group; and compare the confidence level of each product to the confidence threshold, and when the confidence level is below the confidence threshold flagging the product for user review.

25. The computer program product as recited in claim 23, wherein the computer readable program code executing on a processor performs the following steps:

assign weights to the assigned attributes, wherein the weights are used by the clustering of data of the products of the product listing; and update the weights of the assigned attributes when new product data becomes available, wherein the updated weights of the assigned attributes are set between old weights and weights of the new product data.

26. The computer program product as recited in claim 23, wherein the at least one demand rule includes at least one of a prioritization of size, type and brand for a division of products into the demand groups.

27. The computer program product as recited in claim 23, wherein generating demand groups using decision trees includes measuring distance of products to one another in the decision tree.

28. The computer program product as recited in claim 23, wherein utilizing the generated demand groups comprises:

reformatting demand group information by aggregating elements of the demand group information and processing the aggregated elements together as a single element to reduce a processing time of the processor.

* * * * *